US008636836B2

(12) United States Patent
Mudawar et al.

(10) Patent No.: US 8,636,836 B2
(45) Date of Patent: Jan. 28, 2014

(54) FINNED HEAT EXCHANGERS FOR METAL HYDRIDE STORAGE SYSTEMS

(75) Inventors: Issam Mudawar, West Lafayette, IN (US); Milan Visaria, West Lafayette, IN (US); Hui Zhang, Whitewater, WI (US); Timothee Pourpoint, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 232 days.

(21) Appl. No.: 13/147,115

(22) PCT Filed: Feb. 4, 2010

(86) PCT No.: PCT/US2010/023182
§ 371 (c)(1),
(2), (4) Date: Jul. 29, 2011

(87) PCT Pub. No.: WO2010/091171
PCT Pub. Date: Aug. 12, 2010

(65) Prior Publication Data
US 2011/0277972 A1 Nov. 17, 2011

Related U.S. Application Data

(60) Provisional application No. 61/149,911, filed on Feb. 4, 2009, provisional application No. 61/166,451, filed on Apr. 3, 2009, provisional application No. 61/184,585, filed on Jun. 5, 2009.

(51) Int. Cl.
*F17C 13/00* (2006.01)
*F25B 17/12* (2006.01)

(52) U.S. Cl.
USPC .......... 96/146; 206/0.7; 165/104.19; 165/157

(58) Field of Classification Search
USPC ......... 206/0.7; 423/658.2; 502/526; 420/900; 96/146; 429/515; 165/104.19, 104.11, 165/157, 159, 163
See application file for complete search history.

(56) References Cited

U.S. PATENT DOCUMENTS 3,955,782 A 5/1976 Calder et al.
3,978,660 A 9/1976 Laing et al.
(Continued)

FOREIGN PATENT DOCUMENTS

EP 0305702 3/1989
EP 0324266 7/1989
(Continued)

OTHER PUBLICATIONS

Guo, Z., "Enhancement of heat and mass transfer in metal hydride beds with the addition of Al plates," Heat and Mass Transfer 34 (1999) pp. 517-523.
(Continued)

*Primary Examiner* — Frank Lawrence, Jr.
(74) *Attorney, Agent, or Firm* — John V. Daniluck; Douglas G. Gallagher; Bingham Greenebaum Doll LLP

(57) ABSTRACT

Various apparatus and methods for exchanging heat from a solid to a liquid. Some embodiments pertain to removing heat from a pressure vessel in which a gas absorption reaction is occurring. Yet other embodiments pertain to pressure vessels in which hydrogen is being absorbed into a metal hydride.

23 Claims, 23 Drawing Sheets

(56) References Cited

U.S. PATENT DOCUMENTS

| | | | |
|---|---|---|---|
| 4,043,546 A * | 8/1977 | Ashfield et al. | 267/162 |
| 4,120,150 A | 10/1978 | Wakeman | |
| 4,165,569 A * | 8/1979 | Mackay | 34/416 |
| 4,253,516 A | 3/1981 | Giardina | |
| 4,254,618 A | 3/1981 | Elovic | |
| 4,311,232 A * | 1/1982 | Klatt et al. | 206/0.7 |
| 4,457,136 A * | 7/1984 | Nishizaki et al. | 62/46.2 |
| 4,537,249 A * | 8/1985 | Harris | 165/134.1 |
| 4,548,186 A * | 10/1985 | Yamaji et al. | 123/556 |
| 4,665,974 A | 5/1987 | Grehier et al. | |
| 4,756,163 A * | 7/1988 | Garg | 62/46.3 |
| 4,773,212 A | 9/1988 | Griffin et al. | |
| 4,819,717 A * | 4/1989 | Ishikawa et al. | 165/104.12 |
| 4,856,581 A | 8/1989 | Santoro | |
| 4,880,319 A * | 11/1989 | Haggerty | 384/215 |
| 5,046,247 A | 9/1991 | Oguro | |
| 5,082,048 A * | 1/1992 | Iwaki et al. | 165/104.12 |
| 5,123,242 A | 6/1992 | Miller | |
| 5,149,018 A | 9/1992 | Clark | |
| 5,165,466 A | 11/1992 | Arbabian | |
| 5,269,133 A | 12/1993 | Wallace | |
| 5,297,386 A | 3/1994 | Kervistin | |
| 5,317,877 A | 6/1994 | Stuart | |
| 5,337,553 A | 8/1994 | Barr | |
| 5,678,408 A | 10/1997 | Janes | |
| 5,778,972 A | 7/1998 | Sapru et al. | |
| 5,787,976 A | 8/1998 | Hamburgen et al. | |
| 5,794,448 A | 8/1998 | Fujioka et al. | |
| 5,819,525 A | 10/1998 | Gaul et al. | |
| 6,015,041 A | 1/2000 | Heung | |
| 6,170,530 B1 * | 1/2001 | Steblina | 138/89 |
| 6,295,803 B1 | 10/2001 | Bancalari | |
| 6,432,379 B1 * | 8/2002 | Heung | 423/648.1 |
| 6,478,077 B1 | 11/2002 | Story et al. | |
| 6,584,778 B1 | 7/2003 | Griffiths et al. | |
| 6,626,323 B2 | 9/2003 | Stetson et al. | |
| 6,638,348 B2 | 10/2003 | Kuriiwa et al. | |
| 6,672,072 B1 | 1/2004 | Giffin, III | |
| 6,709,497 B2 | 3/2004 | Myasnikov et al. | |
| 6,857,270 B2 | 2/2005 | Kobayashi et al. | |
| 6,878,353 B2 | 4/2005 | Ovshinsky et al. | |
| 6,939,392 B2 | 9/2005 | Huang et al. | |
| 6,993,913 B2 | 2/2006 | Kobayashi et al. | |
| 7,000,404 B2 | 2/2006 | Palmisano et al. | |
| 7,112,239 B2 | 9/2006 | Kimbara et al. | |
| 7,115,159 B2 * | 10/2006 | Fujita et al. | 96/108 |
| 7,143,581 B2 | 12/2006 | Kobayashi et al. | |
| 7,185,483 B2 | 3/2007 | Czachor | |
| 7,231,769 B2 | 6/2007 | Spadaccini et al. | |
| 7,269,955 B2 | 9/2007 | Albers et al. | |
| 7,320,726 B2 | 1/2008 | Shih et al. | |
| 7,323,043 B2 | 1/2008 | Finamore | |
| 7,326,281 B2 | 2/2008 | Fujita et al. | |
| 7,431,756 B2 | 10/2008 | Myasnikov et al. | |
| 7,448,441 B2 | 11/2008 | Hendricks et al. | |
| 7,455,723 B2 | 11/2008 | Voss et al. | |
| 7,478,525 B2 | 1/2009 | Iya et al. | |
| 7,487,642 B2 | 2/2009 | Joshi et al. | |
| 7,607,307 B2 | 10/2009 | Bergholz | |
| 7,640,751 B2 | 1/2010 | Putnam | |
| 2002/0006365 A1 * | 1/2002 | Suzuki et al. | 422/177 |
| 2002/0073618 A1 | 6/2002 | Ovshinsky et al. | |
| 2003/0209147 A1 | 11/2003 | Myasnikov et al. | |
| 2003/0209149 A1 | 11/2003 | Myasnikov et al. | |
| 2006/0053801 A1 | 3/2006 | Orlando et al. | |
| 2006/0060328 A1 * | 3/2006 | Ewes et al. | 165/80.2 |
| 2006/0108098 A1 | 5/2006 | Stevanovic et al. | |
| 2007/0000562 A1 | 1/2007 | Handa | |
| 2007/0220731 A1 * | 9/2007 | Soroka et al. | 29/447 |
| 2008/0168776 A1 | 7/2008 | Arnold et al. | |
| 2008/0185123 A1 | 8/2008 | Nelson et al. | |
| 2008/0229755 A1 | 9/2008 | Koganezawa et al. | |
| 2008/0302246 A1 * | 12/2008 | Carruthers et al. | 96/154 |
| 2009/0107853 A1 | 4/2009 | Tan et al. | |
| 2009/0133400 A1 | 5/2009 | Callas | |

FOREIGN PATENT DOCUMENTS

| | | |
|---|---|---|
| EP | 0325452 | 7/1989 |
| EP | 0651145 | 5/1995 |
| EP | 0924409 | 6/1999 |
| EP | 0961095 | 12/1999 |
| EP | 1154135 | 4/2006 |
| FR | 2563899 | 11/1985 |
| GB | 2080933 | 2/1982 |
| GB | 2365114 | 2/2002 |
| KR | 2005-0077734 | 8/2005 |
| WO | 9518947 | 7/1995 |
| WO | 0216743 | 2/2002 |
| WO | 2005117559 | 12/2005 |
| WO | 2008087526 | 7/2008 |

OTHER PUBLICATIONS

Rosso, M.J. et al., "Heat Transfer Enhancement in Metal Hydride Systems," Alternative Energy Sources II, (1979) pp. 3539-3545.

Suda, S. et al., "Effective Thermal Conductivity of Metal Hydride Beds," Journal of the Less-Common Metals, 89 (1983) pp. 317-324.

Chen, Yun et al., "Metal hydride beds and hydrogen supply tanks as minitype PEMFC hydrogen sources," International Journal of Hydrogen Energy 28 (2003) pp. 329-333.

Nagel, M. et al., "Effective Thermal Conductivity of a Metal Hydride Bed Augmented with a Copper Wire Matrix," Journal of the Less-Common Metals, 120 (1986) pp. 35-43.

PCT Application No. PCT/US2010/023182, International Preliminary Report on Patentability. Aug. 18, 2011.

PCT Application No. PCT/US2010/023182, International Search Report and Written Opinion. Mar. 31, 2010.

Mason, John L., "Heat Transfer in Crossflow," Proceedings of the second US National Congress of Applied Mechanics, University of Michigan, Ann Arbor, Michigan, pp. 801-803. Jun. 14, 1954.

Copeland, D., et al., Manifold Microchannel Heat Sinks: Isothermal Analysis, InterSociety Conference on Thermal Phenomena, pp. 251-257. Jan. 1, 1996.

Bruening, G., et al., "Cooled Cooling Air Systems for Turbine Thermal Management," presented at the International Gas Turbine & Aeroengine Congress & Exhibition, Indianapolis, IN, pp. 1-7. Jun. 7, 1999.

Bowers, M., et al., "Two-Phase Electronic Cooling Using Mini-Channel and Micro-Channel Heat Sinks: Part 1—Design Criteria and Heat Diffusion Constraints," Journal of Electronic Packaging, vol. 116, (1994) pp. 290-297.

Bowers, M., et al., "Two-Phase Electronic Cooling Using Mini-Channel and Micro-Channel Heat Sinks: Part 2—Flow Rate and Pressure Drop Constraints," Journal of Electronic Packaging, vol. 116, (1994) pp. 298-305.

Bowers, M. et al., "High flux boiling in low flow rate, low pressure drop mini-channel and micro-channel heat sinks," Int. J. Heat Mass Transfer, vol. 37, No. 2, (1994) pp. 321-332.

Huang, H., et al., "Fuel-Cooled Thermal Management for Advanced Aeroengines," J. Eng. for Gas Turbines and Power, vol. 126, (2004) pp. 284-293.

Willingham, T.C., "Channel height effects on forced-convection boiling and critical heat flux from a linear array of discrete heat sources," Int. J. Heat Mass Transfer, vol. 35, No. 8, (1992) pp. 1865-1880.

U.S. Appl. No. 13/147,094, Non-Final Office Action May 23, 2013.

Aceves, S.M., et al., "Vehicular storage of hydrogen in insulated pressure vessels," International Journal of Hydrogen Energy, 31 (2006) 2274-2283.

Mori, D., et al., "Recent challenges of hydrogen storage technologies for fuel cell vehicles," International Journal of Hydrogen Energy, 34 (2009) 4569-4575.

Mellouli, F., et al., "Numerical study of heat exchanger effects on charge/discharge times of metal-hydrogen storage vessel," International Journal of Hydrogen Energy, 34 (2009) 3005-3017.

(56) References Cited

OTHER PUBLICATIONS

Botzung, S., et al., "Simulation and experimental validation of a hydrogen storage tank with metal hydrides," International Journal of Hydrogen Energy, 33 (2008) 98-104.

Laurencelle, F., et al., "Simulation of heat transfer in a metal hydride reactor with aluminum foam," International Journal of Hydrogen Energy, 32 (2007) 2957-2964.

Kapischke, J., et al., "Measurement of the effective thermal-conductivity of a metal hydride bed with chemical-reaction," Exp. Therm. Fluid Sci., 9 (3) (1994) 337-344.

Hydrogen, fuel cells and infrastructure technologies program, multi-year research, developent and demonstration plan: planned program activities for 2005-2015, Energy Efficiency and Renewal Energy, U.S. Department of Energy, Washington, DC, 2007.

* cited by examiner

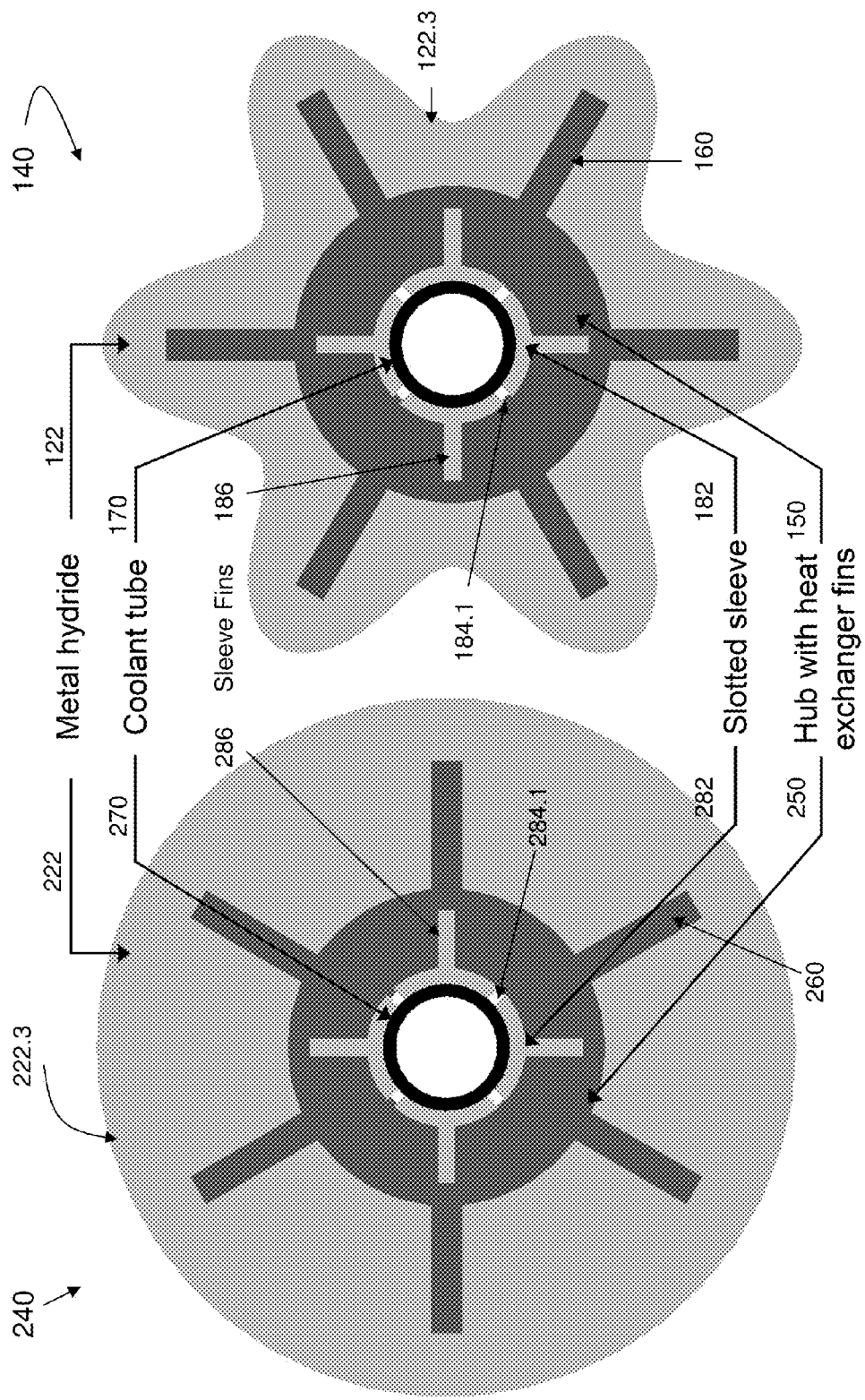

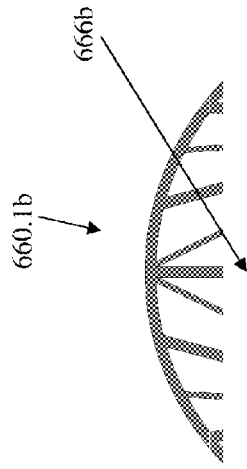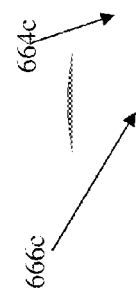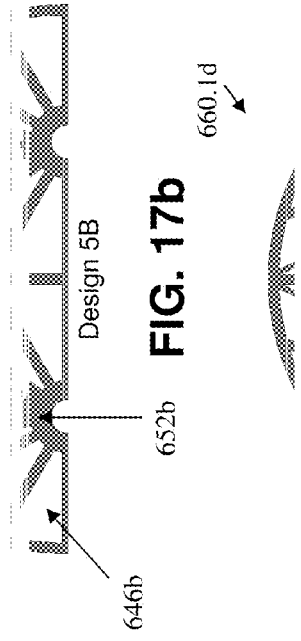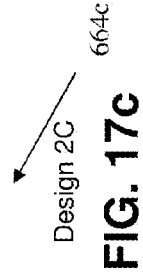
FIG. 17a
FIG. 17b
FIG. 17c
FIG. 17d

FINNED HEAT EXCHANGERS FOR METAL HYDRIDE STORAGE SYSTEMS

CROSS REFERENCE TO RELATED APPLICATION

This application is a national stage application of PCT/US2010/023182, filed Feb. 4, 2010, which claims the benefit of priority to U.S. Provisional Patent Application Ser. No. 61/149,911, filed Feb. 4, 2009, entitled MODULAR HEAT EXCHANGER FOR METAL HYDRIDE HYDROGEN STORAGE, U.S. Provisional Patent Application Ser. No. 61/166,451, filed Apr. 3, 2009, entitled MODULAR FINNED HEAT EXCHANGER FOR METAL HYDRIDE TANK, and U.S. Provisional Patent Application Ser. No. 61/184,585, filed Jun. 5, 2009, entitled FINNED HEAT EXCHANGERS FOR METAL HYDRIDE SYSTEMS, all of which are incorporated herein by reference.

FIELD OF THE INVENTION

Various embodiments of the present invention pertain to heat exchangers and in particular to heat exchangers for cooling and heating of powders, and in particular heating and cooling of metal hydrides.

BACKGROUND

The ever increasing dependence on limited fossil fuel resources and resulting pollution have created an urgent need for cleaner fuel sources in pursuit of a more secure energy future. One alternate fuel source is hydrogen. Unlike fossil fuels, which produce energy by combustion and yield polluting byproducts, hydrogen is consumed by chemical reaction with oxygen forming only water as a byproduct. Thus, hydrogen has enormous potential as a clean power source for future generation of automobiles.

Automobiles require a pre-specified minimum mass of hydrogen to run for long distances before refueling. Calculations reveal 7 kg of hydrogen are used to run a vehicle for about 300 miles. The density of hydrogen at atmospheric temperature and pressure is 0.083 g/L while at a pressure of 700 bars it is 39.6 g/L. The 700 bar limit is set by the pressure rating for high-strength, lightweight carbon-fiber composite tanks. Further research is required to increase this limit by strengthening composite fibers and ensuring impermeability to hydrogen gas. The aforementioned density value means 7 kg of hydrogen gas at 700 bars would occupy about 220 liters. Such a volume is far too large to be stored on-board a vehicle. To reduce the volume to an acceptable level, hydrogen can be stored in liquid form at cryogenic temperatures. The density of liquid hydrogen at 20.3 K is 70.8 g/L, roughly twice the density of compressed hydrogen at 700 bars. Thus, cryogenic storage would use about 100 liters to store 7 kg of liquid hydrogen. Two disadvantages of liquid hydrogen storage are high-energy consumption, associated with the liquefaction process, and continuous boil-off during storage due to the difficulty in thermally insulating the liquid hydrogen at such low temperatures.

Another promising and practical alternative to high-pressure gas storage and cryogenic liquid storage is the use of metal hydrides. Many metals (M) and alloys can react reversibly with hydrogen to form metal hydrides.

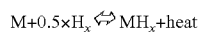

The hydriding (forward) process of the reaction absorbs the hydrogen and releases heat, while the dehydriding (reverse) process requires heat input to release the hydrogen. The hydriding process is the process that occurs while filling the vehicle with hydrogen at the filling station. The dehydriding process occurs when the hydrogen stored in the metal hydride is de-absorbed to be used in the fuel cell for power production. The rates of both the hydriding (charging) and dehydriding (discharging) processes are highly dependent on temperature, i.e., they are kinetics-driven. The hydriding process preferably includes quick removal of the heat generated by the reaction for the process to proceed. If the heat is not removed efficiently, the temperature would rise to a level that can stall the reaction. This temperature limit is different for different metal hydrides and is about 80° C. for metal hydrides currently being tested in automotive research. The dehydriding process requires heating the metal hydride to a temperature that depends on chemical thermodynamics. The dehydriding process cannot occur without heating.

In the vehicle, heat is generated while charging the metal with hydrogen at the filling station. The 2015 target for refueling time is less than 5 minutes. In order to achieve such a fast refueling rate, it is helpful that the high-rate heat generation associated with the fast hydriding process be removed efficiently. Removing the heat is even more challenging with faster refueling rate (i.e., shorter refueling time) because of the greater rate of heat generation. Subsequent release of hydrogen from the metal hydride for fuel cell use is achieved by heating to a specific temperature.

The volumetric density of metal hydrides (volume occupied by hydrogen per unit volume of metal hydride) is comparable to that of liquid nitrogen. But a major disadvantage of metal hydrides is low gravimetric density (mass of hydrogen stored per unit mass of metal hydride). Hence, a heat exchanger that occupies a small volume and provides as much of the available storage space for the metal hydride is required to quickly and efficiently remove the heat as it is generated by the hydriding process. The heat exchanger should also allow for thermal expansion of the metal hydride at higher temperatures.

The operating pressure of metal hydrides is directly related to temperature. At a given temperature, the operating pressure should be higher than an equilibrium pressure for the hydriding process to occur. The equilibrium pressure depends on the temperature and thermodynamic properties of the metal hydride. Increasing the operating pressure increases the temperature limit above which the hydriding process stalls. Exceeding the equilibrium pressure corresponding to the afore-mentioned 80° C. temperature requires metal hydride operating pressures in the range of 400-500 bars. Hence the heat exchanger should be designed to withstand such high pressures.

Metal hydrides can be available in powder form, or formed into pellets of any desired shape. Hence, the heat exchanger in a hydrogen vehicle is a storage device for metal hydrides that can provide sufficient cooling at high pressures to maintain temperature levels that render the hydriding and dehydriding processes highly efficient.

SUMMARY OF THE INVENTION

Various embodiments of the present invention pertain to apparatus and methods for removing heat, especially for transferring heat from a powder to a liquid.

One aspect of the present invention pertains to an apparatus for exchanging heat between a medium and a substance. Some embodiments include a pressure vessel and a plurality of heat exchanging modules within the interior. The modules each include a hub having first and second passages each having a tapered inner wall. A plurality of fins extend outwardly from the hub. Yet other embodiments include a pair of sleeves each having a tapered exterior and being received in a different one of the passages.

Another aspect of the present invention pertains to an apparatus for holding a compressed gas. Some embodiments include a pressure vessel having a first port for receiving a heat exchanging medium and a second port for returning the medium. The pressure vessel defines an interior with a plurality of modules within the interior. Each module includes a hub having a plurality of heat exchanging fins extending outwardly from a central portion. The hub includes a first passage in fluid communication with the first port and a second passage in fluid communication with the second port. A gas absorbing solid substance substantially surrounds the fins.

Still another aspect of the present invention pertains to an apparatus for exchanging heat with a coolant. Some embodiments include a heat exchanging body including an outermost wall, at least one hub, and a plurality of fins extending from the hub to the outermost wall. The plurality of fins are arranged in a pattern capable of being extruded. The inner surface of the hub is tapered at an angle. Still other embodiments include a sleeve having an outer surface tapered with about the same angle as the angle of the hub, and a tube received within the inner surface of said sleeve.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is excessive and unnecessary.

BRIEF DESCRIPTION OF THE DRAWINGS

FIG. 9 is a cross-sectional representation of a heat exchanger module according to another embodiment of the present invention.

FIG. 10 is a cross-sectional representation of a heat exchanger module according to another embodiment of the present invention.

FIG. 13a is a plan view of a finned plate of the apparatus of FIG. 12.

FIG. 13b is a perspective representation of the apparatus of FIG. 13a.

FIGS. 17 (a, b, c and d) are half-section plan views of finned plates, each according to a different embodiment of the present invention.

DESCRIPTION OF THE PREFERRED EMBODIMENT

Figure 1:
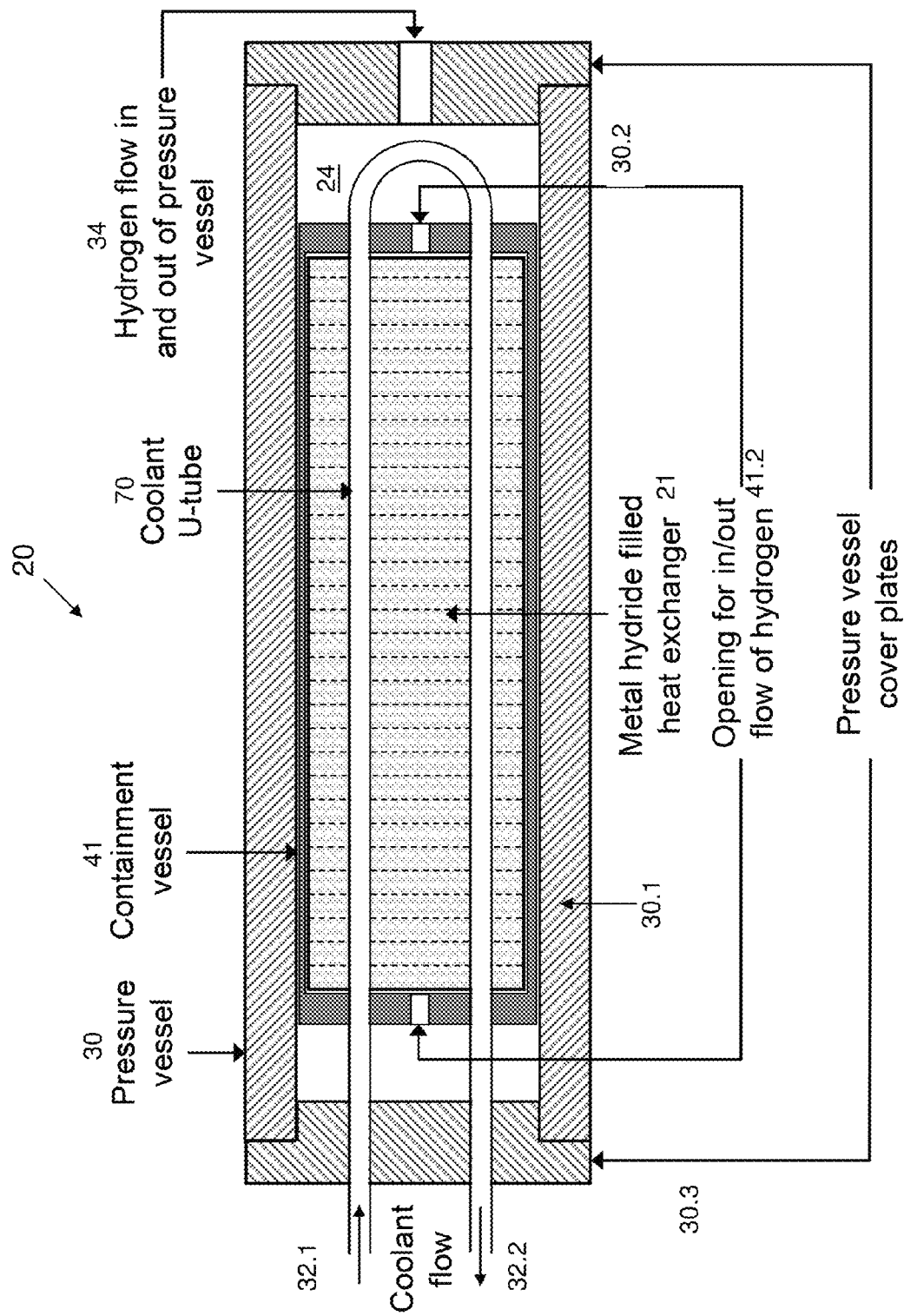
FIG. 1 is a cross-sectional schematic representation of a gaseous storage system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that must be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, etc.) may be stated herein, such specific quantities are presented as examples only. Further, discussion pertaining to a specific composition of matter, that description is by example only, does not limit the applicability of other species of that composition, nor does it limit the applicability of other compositions unrelated to the cited composition.

Various embodiments of the present invention pertain to a gaseous storage system. In one embodiment, the system includes a quantity of a gas-absorbing solid material placed within a pressure vessel. The pressure vessel also contains one or more heat exchangers for transferring heat into and out of the solid substance as a gas is desorbed or absorbed, respectively.

Yet other embodiments of the present invention pertain to configurations of heat exchangers. In some embodiments, these heat exchangers are configured to transfer heat into and out of a solid substance and into a liquid cooling medium. However, other embodiments of the present invention contemplate the transfer of heat into and out of a substance in any physical state (gas, liquid, or solid) and into a fluid medium (gas or liquid).

Yet other embodiments of the present invention pertain to methods and apparatus for constructing a heat exchanger. In one embodiment, there is a generally cylindrical heat exchanger with at least one central cooling passage and a plurality of fins radiating outwardly from that passage. In some embodiments the fins interconnect a hub with an outermost ring. The hub includes at least one passage for the flow of a cooling medium. The material being heated or cooled is placed between the hub and the outer ring. Preferably the fin pattern is arranged so that the body of the heat exchanger can be extruded from a material, such as aluminum.

Yet another embodiment of the present invention pertains to a heat exchanger with low contact resistance from a plurality of heat conducting fins to a cooling medium. In some embodiments this is accomplished by arranging the fins such that they transfer heat to a common hub. A coolant tube passes through the hub. In some embodiments the hub defines a conically-shaped inner diameter and the cooling tube defines a complimentary-shaped conical outer diameter. The hub and fins can be slid along the length of the cooling tube until there is a tight fit between the hub I.D. and the tube O.D. The hub can be maintained in the tight-fitting configuration by a fastening device that couples to one of the hub or the tube and pushes against (or pulls against) the other of the hub or the tube.

In yet other embodiments, the coolant tube has a generally cylindrical outer diameter, and is received within a complimentary-shaped cylindrical inner diameter of a sleeve. In one embodiment, the sleeve has an outer diameter that is tapered and adapted and configured to fit within a hub having a similar taper.

In yet other embodiments, the sleeve has one or more areas in which the compressive hoop stiffness of the sleeve is lessened. As one example, this localized area of reduced stiffness can be longitudinally-arranged slots extending along at least a portion of the length of the sleeve. When the tube is placed within the sleeve, and this subassembly placed within a tapered hub, the hub can be slid along the length of the sleeve until it comes into sufficient interference with the outer surface of the sleeve that the areas of reduced stiffness permit deformation of the sleeve into the hub. This deformation helps accomplish a tight fit and subsequently low contact resistance between the sleeve and the hub, and further between the sleeve and the outer diameter of the tube.

In some embodiments, the outer surface of the sleeve has a conical shape. However, the present invention is not so constrained, and contemplates other embodiments in which the cross-sectional shape of the sleeve (with reference to the outer surface) is square, triangular, oval, or any other shape. As one example, in an embodiment in which the outer surfaces of the sleeve are flat with a triangular cross-section, each of the three sides would include a taper and the outer shape of the sleeve would bear resemblance to a three-sided pyramid. In those embodiments having a generally square cross-sectional shape, the outer shape of the tapered sleeve would bear resemblance to a four-sided pyramid shape.

Yet other embodiments of the present invention contemplate the use of a tapered sleeve, but without the areas of locally-reduced stiffness. In such embodiments, the outer surface of the sleeve, and/or the inner surface of the hub can be coated with a highly conductive, soft material that deforms as the fin slides along the length of the tapered sleeve. As one example, this material could be a foil or layer of indium-containing material.

Various embodiments of the present invention pertain to apparatus and methods for removing heat from a pressure vessel in which a gas is absorbed onto a metal, such as a metal powder. In certain embodiments, the absorbed gas is hydrogen, and the solid substance is a metal hydride powder. However, it is understood that other embodiments are not so limited and pertain to the cooling or heating of the gas absorption process in general, and in some embodiments with regards to containment of the absorption reaction in a pressure vessel.

With regards to the absorption of hydrogen in a metal hydride, there is heat given off during the absorption reaction. It is desirable to remove this heat both to increase the rate at which the hydrogen is absorbed within the hydride material, and further to maintain acceptable and safe temperature of the pressure vessel assembly. In some applications, the hydrogen gas is stored for later use in propulsion of a vehicle, such as an automobile that is powered by a fuel cell.

In such applications, it is desirable to configure the pressure vessel and the filling method such that the tank can be substantially full within a commercially-acceptable period of time. In one embodiment, the acceptable period of time is about 300 seconds, although it is understood that this fill time is not a limitation on any embodiment of the present invention, and further that other embodiments contemplate the configuration of the apparatus and method to achieve acceptable fill times for the particular application. In some applications, the heat exchangers are configured not to achieve a particular fill time, but instead to achieve a particular heat flux. As one example, in some military applications, various embodiments of the present invention can be used not only to achieve desirable fill times, but also to achieve desirable levels of heat generation, especially for those applications in which the heat is used in another apparatus or method. For example, the heat given off during the hydriding reaction can be used to power any Carnot cycle engine, or be used in any application in which the addition of heat is desirable.

One aspect of some embodiments of the present invention pertains to heat exchangers that can be substantially filled with hydrogen in under 300 seconds. Various versions of a two dimensional analytical modal were analyzed, a candidate configuration was selected from those versions and that candidate version was constructed and tested.

In the computer modeling of the various heat exchanger configurations, some of the following parameters were used: (1) the pressure vessel had an inner diameter of about four inches; (2) the tube for providing coolant had an outer diameter of about three-eighths inches, and a wall thickness of about one-sixteenth inch; (3) the initial temperature of the pressure vessel was about twenty degrees C.; (4) the contact resistance from the metal hydride to the conducting surface of the heat exchanger was about one-thousandth millimeters squared—degrees Kelvin per watt; (5) the coolant medium was Dexcool® at a flowrate of about twenty liters per minute with a pressure differential from the coolant inlet to the coolant outlet of about seven bars; (6) the pressure vessel was pressurized with hydrogen with a pressurization profile from one bar to five-hundred bars in sixty seconds, with a constant maximum pressure held thereafter; (7) the pressure vessel contained about six kg of hydrogen; and (8) the length of the pressure vessel was less than about one meter.

The metal hydride selected for the modeling and subsequent testing is a hydride that incorporates Titanium, Chromium, and Manganese. In particular, a composition of the formula Ti(1.1)CrMn was used. However, various embodiments of the present invention are not so constrained, and the apparatus and methods described and claimed are applicable with any type of solid material in which a gas is absorbed, and in particular to any type of metal hydride.

Various parameters of the reaction kinetics are provided in Table 1, below.

TABLE 1

| Symbol | Value | Units |
| --- | --- | --- |
| Ca (Activation rate) | 150 | 1/s |
| Ea (Activation Energy) | 20,700 | J/mol-H2 |
| delta- S (enthalpy change) | −113.4 | J/K-mol-H2 |
| Cp (sp. heat of MH) | 500 | J/kg-K |
| MW_H2 | 2.0158 | g/mol |

These modeling parameters are given by way of example only. As in any modeling exercise, one or more of the aforementioned parameters were varied over a range. Further, it is understood that these parameters do not necessarily describe the claimed apparatus or methods.

Figure 3:
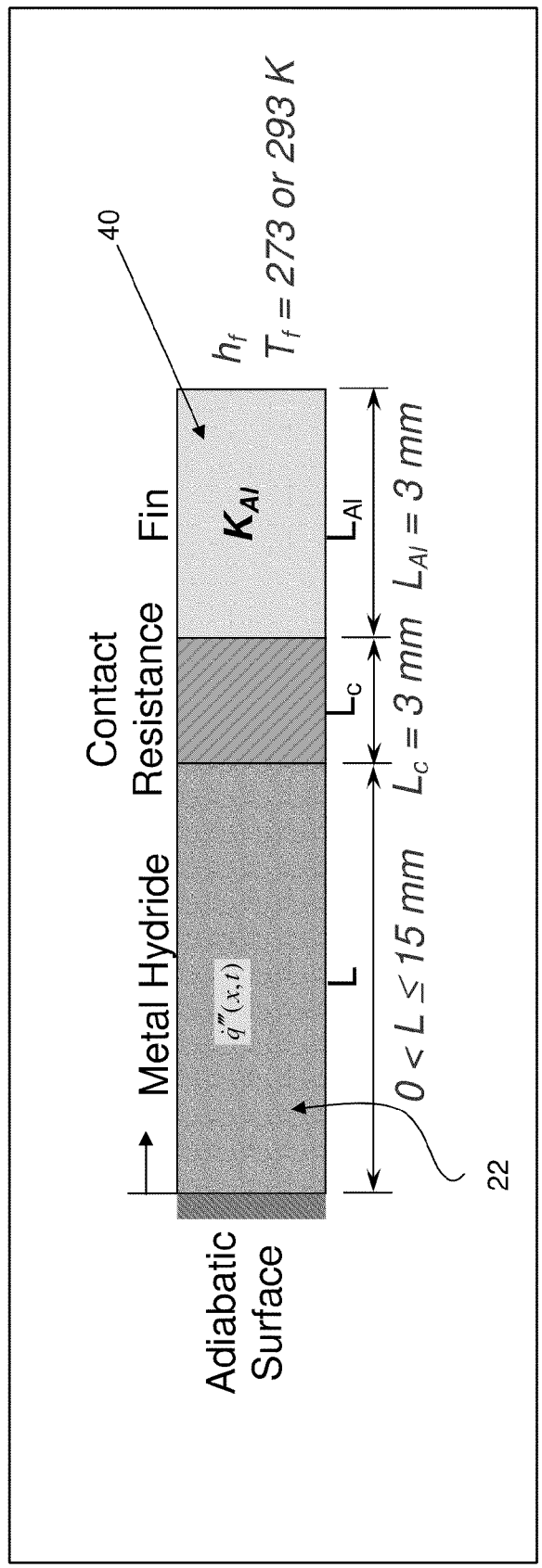
FIG. 3 is a schematic representation of a one dimensional heat transfer model.

Some computer modeling was performed with a one dimensional model created in Matlab®. This model helped provide an estimate of the allowable pocket widths for the metal hydride material, and further to understand the affect of various parameters such as the metal hydride (MH) properties, pressurization profile, contact resistance, coolant temperature, flowrate, and others on the performance of the heat exchangers (including ease of manufacturing, handling, weight, volume and cost) and further on the fill times. With the use of the one-dimensional model (refer to FIG. 3), different two-dimensional heat exchanger design models were created in Fluent® and their performance was analyzed by varying a variety of parameters.

Figure 2:
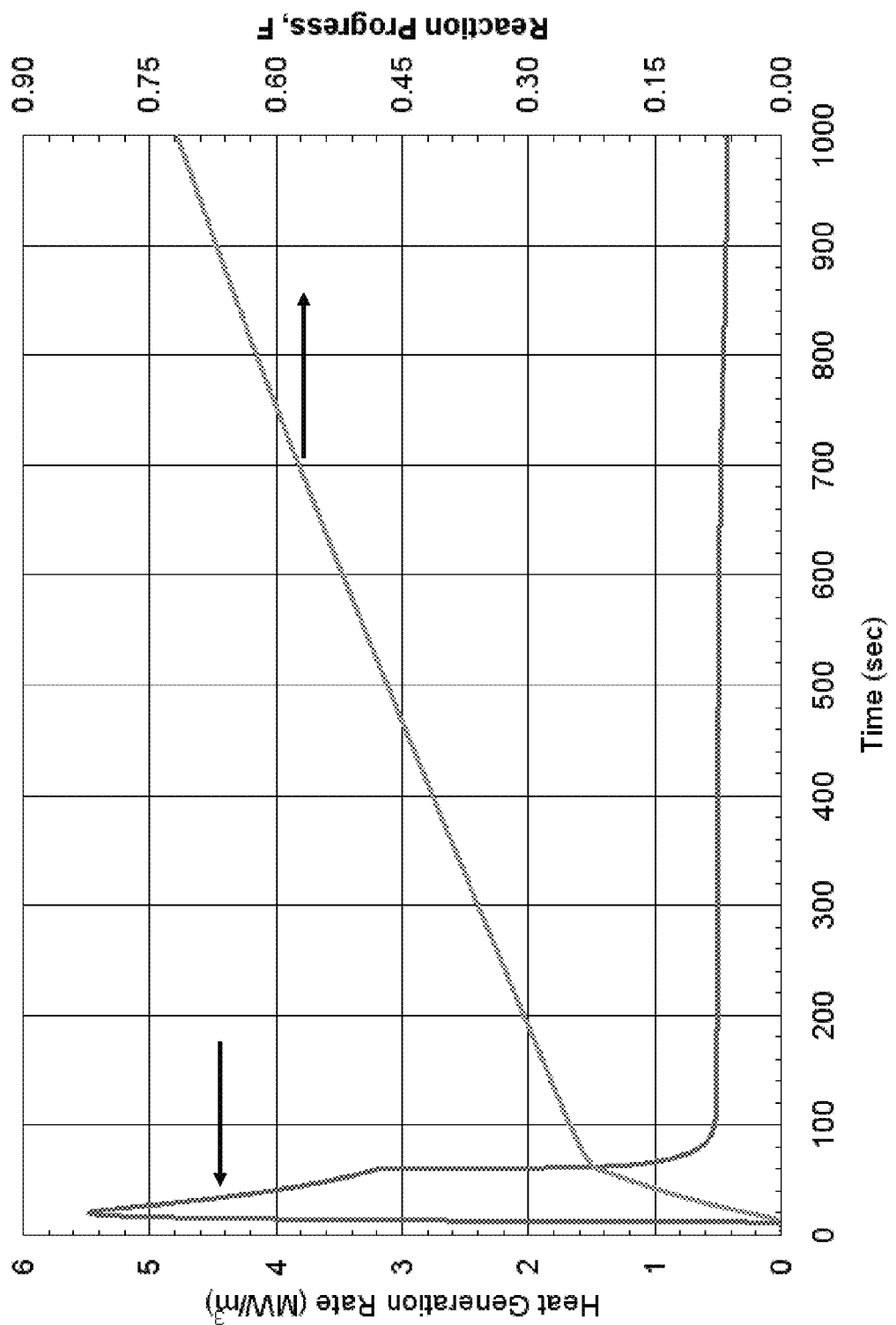
FIG. 2 is a graphical representation of time-based parameters relating to a hydriding reaction.

FIG. 2 is a time-based graphical representation of two parameters related to filling of the pressure vessel: heat generation rate and the percent completion of the reaction (reaction progress). Referring to the left most vertical axis, it can be seen that there is a substantial spike in heat generation at about twenty seconds, which then falls to a low, near-constant value at about one-hundred seconds. During this early period, it can be seen that the reaction rate is fairly linear at a first, higher rate, and then at about sixty seconds changes to a second, reduced linear rate. This plot shows that there is substantial heat given off by the filling operation in the first minutes of operation.

From the one-dimensional modeling, it was found that there is a maximum allowable width for a pocket, taking into account various quantities such as the density, specific heat, and thermal conductivity of the hydride; the void characteristics of the hydride; the pressure history of the pressure vessel; the enthalpy and entropy associated with the materials and the reactions; and others. It was found that in some systems, for a pressure vessel as previously described and for a fill time of 300 seconds or less, that the pocket of metal hydride should be less than twenty millimeters from a cooling fin, and preferably less than fifteen millimeters from a cooling fin. It was also found that contact resistance is helpful in reducing the fill time. Lowered contact resistance (as from the hydride to the fin, and further from the hub to the coolant tube) lowers the fill time. Further reduction in fill time can be obtained by increasing the coolant flowrate.

Figure 4A:
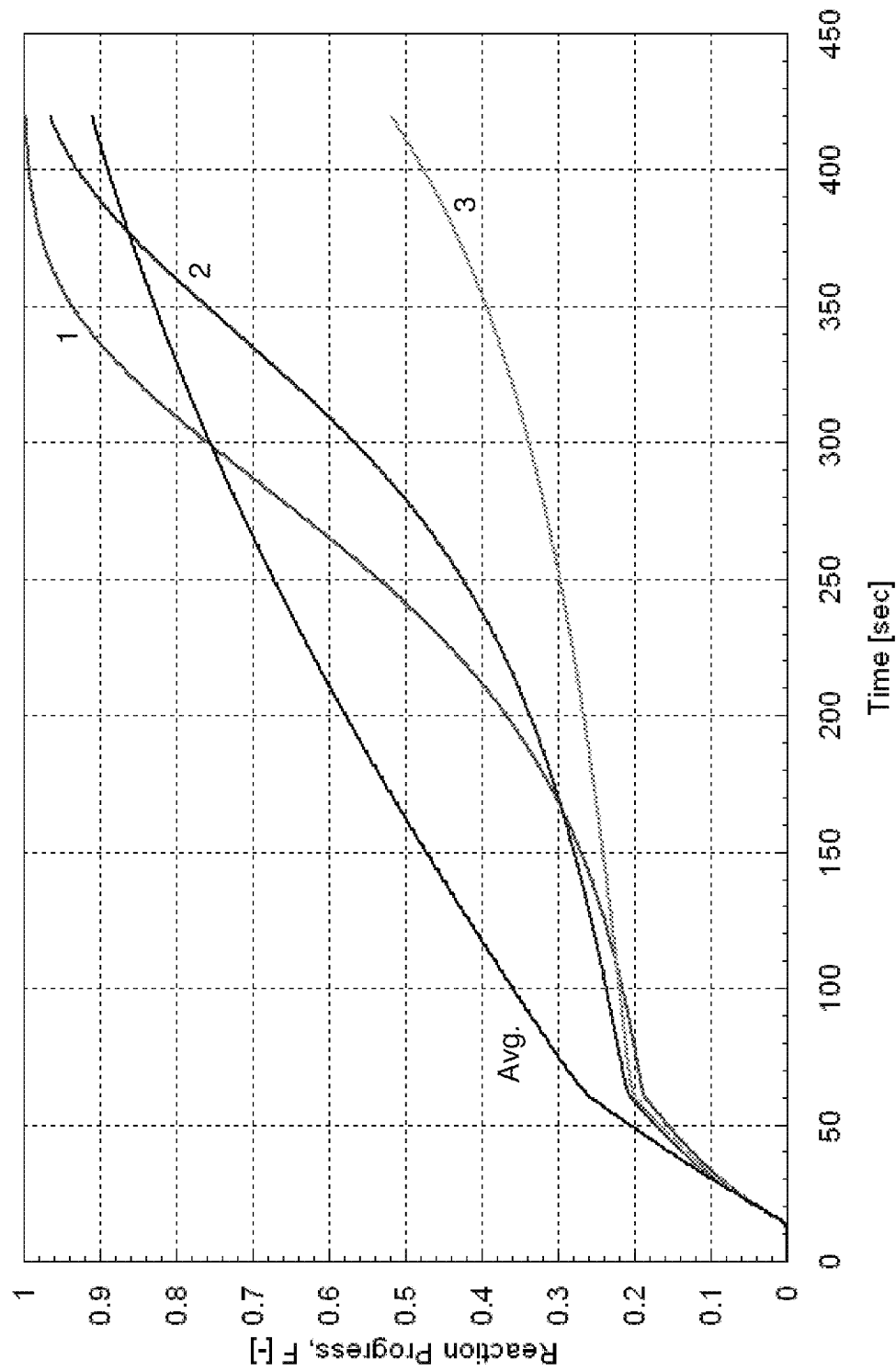
FIG. 4a is a graphical, time-based representation of reaction progress of a hydriding reaction within different pockets of a hydride material.
Figure 4B:
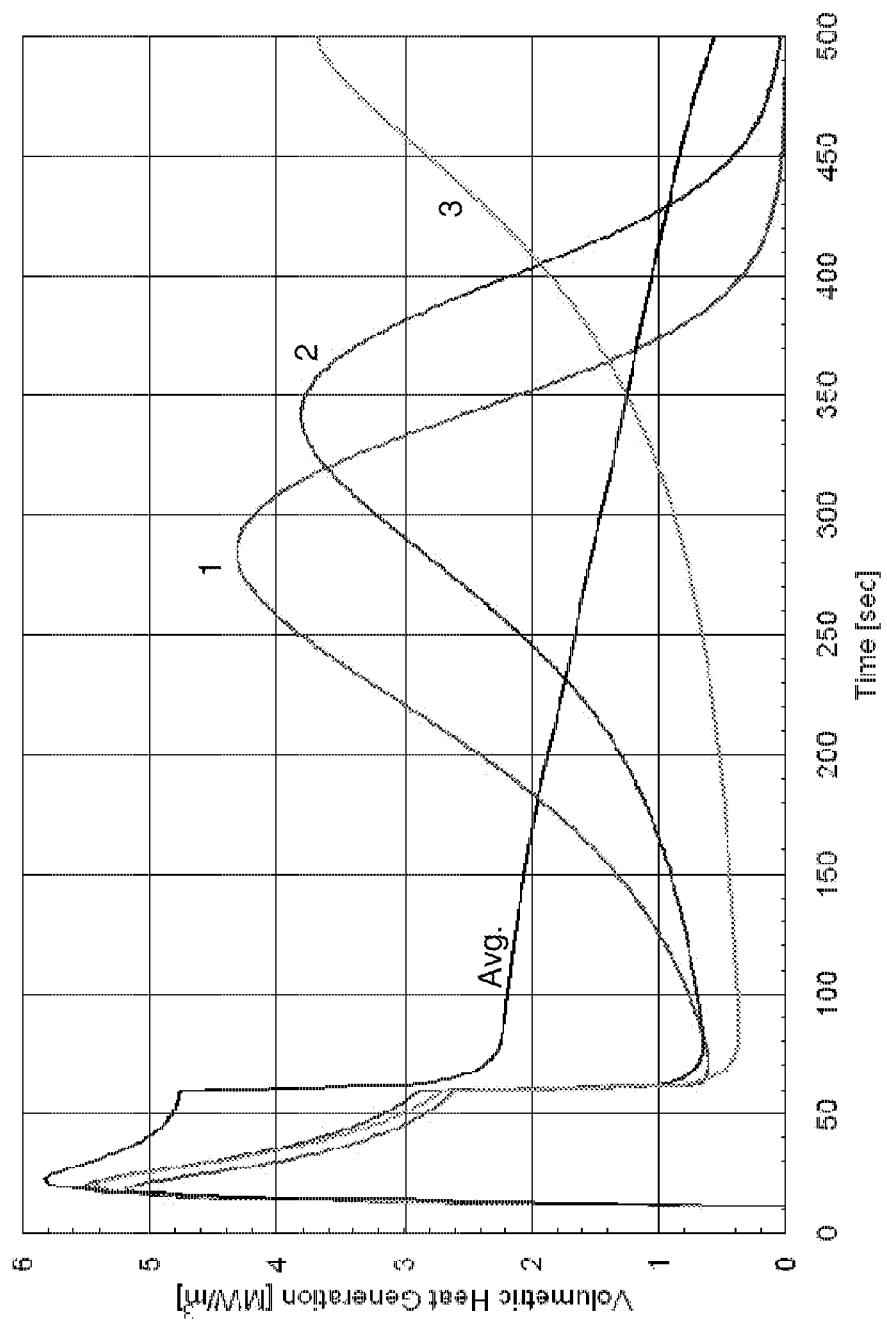
FIG. 4b is a graphical, time-based representation of heat generation for a hydriding reaction within different pockets of hydride material
Figure 4C:
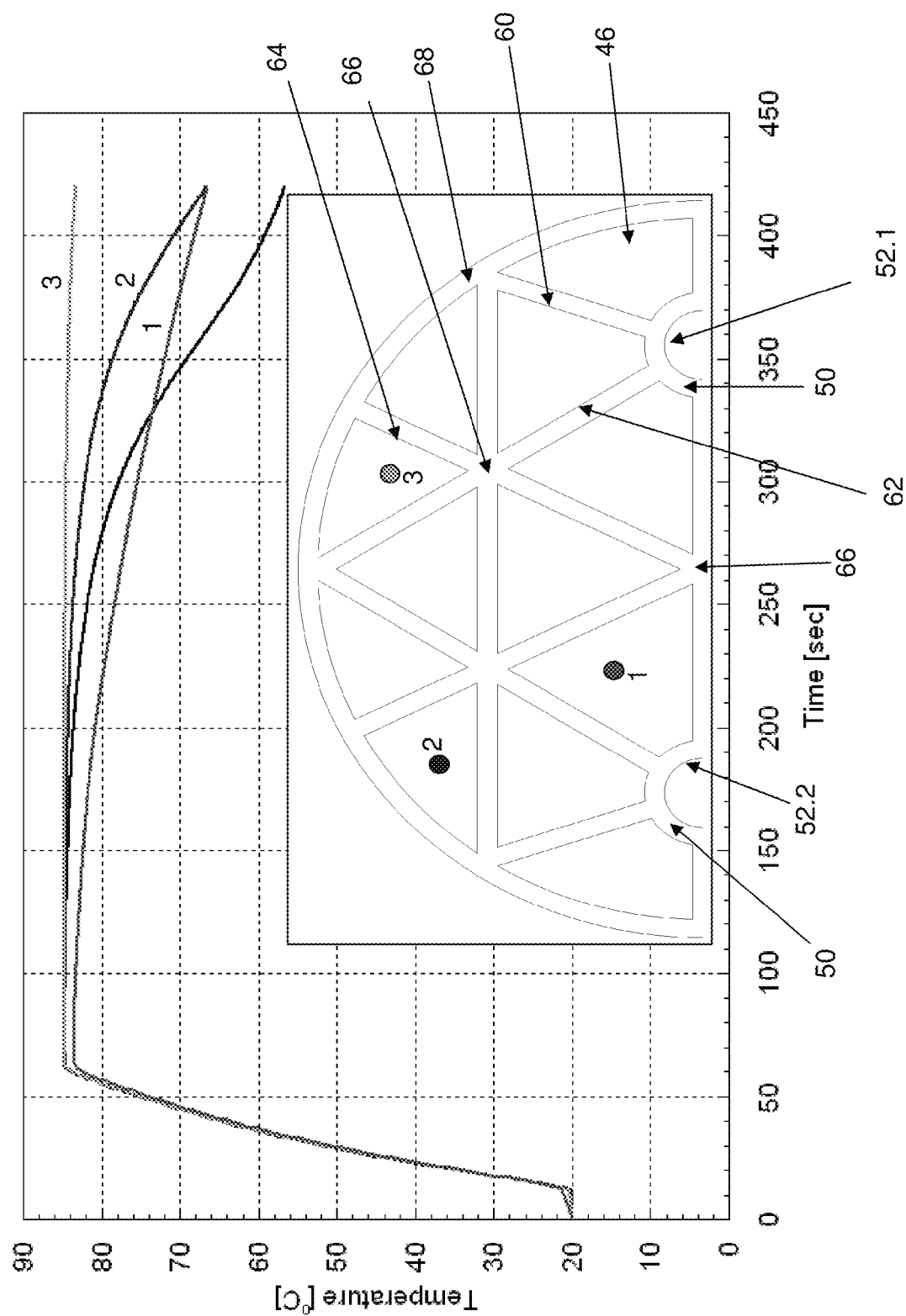
FIG. 4c is a graphical, time-based representation of the temperature of the metal hydride within different pockets of hydride material.
Figure 4D:
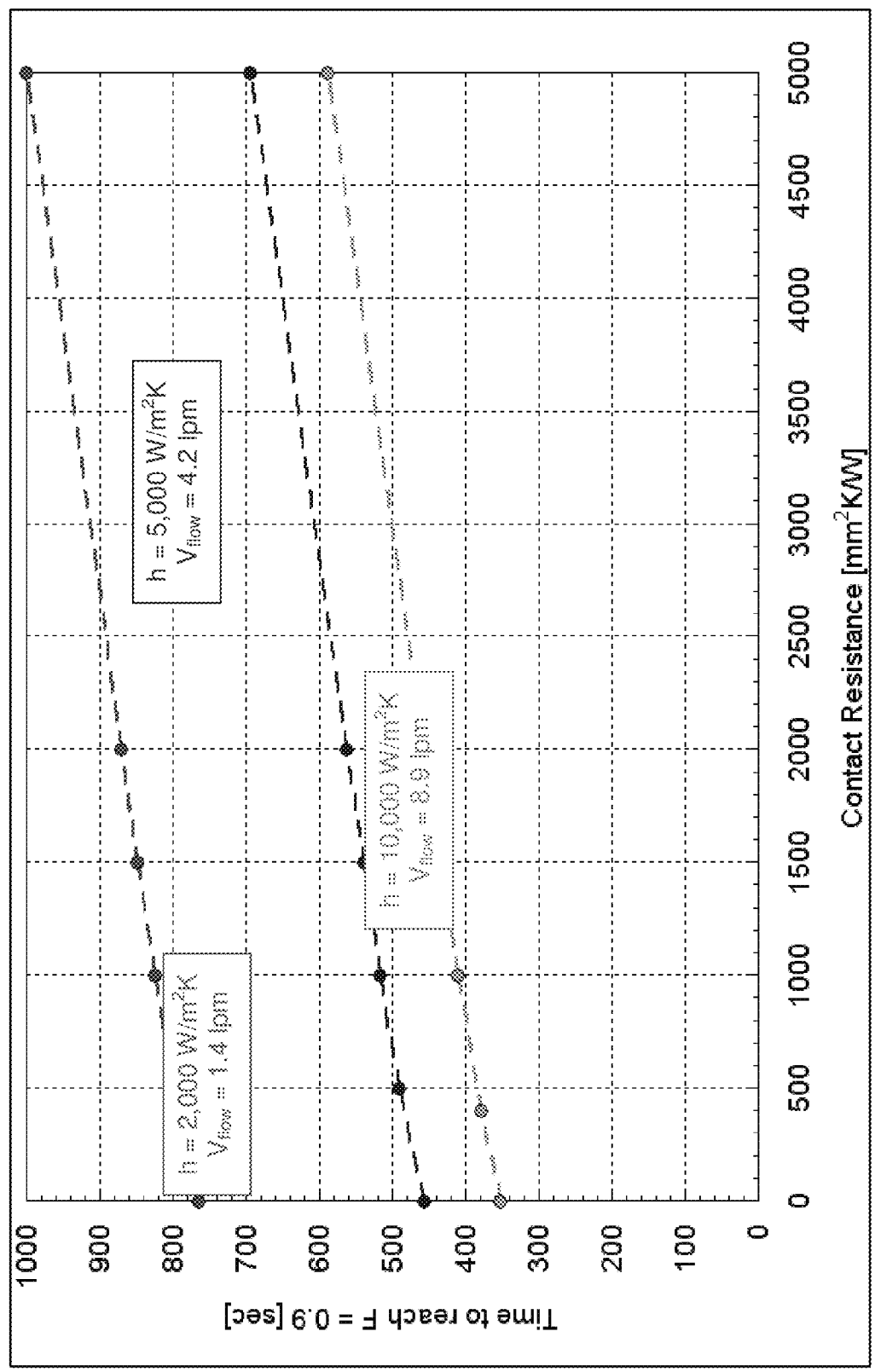
FIG. 4d is a graphical representation of the time estimated to reach a ninety percent full container as functions of coolant convective coefficient and contact resistance.
Figure 5:
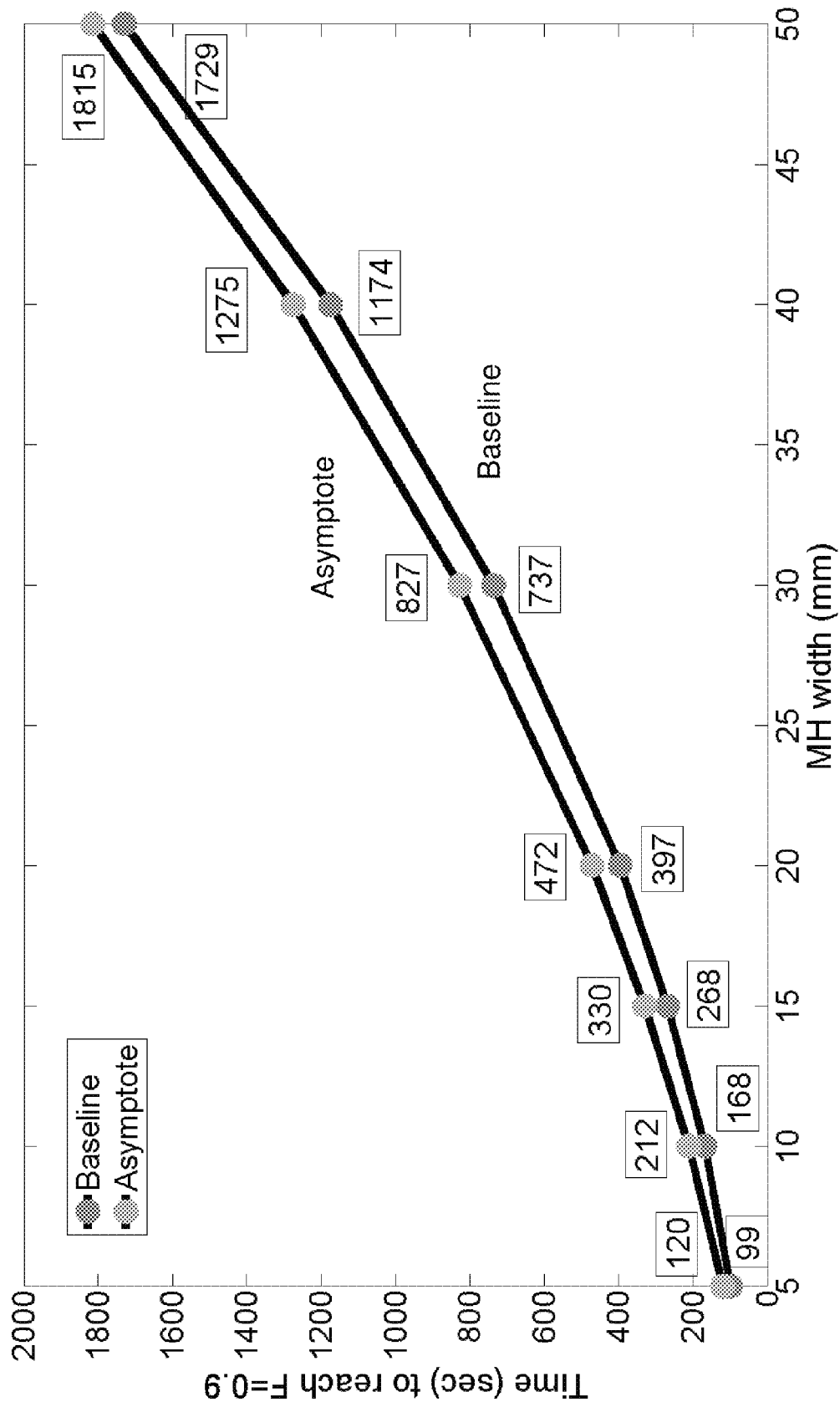
FIG. 5 is a graphical representation of the time to reach a ninety percent full container as a function of the width of the metal hydride pocket.

Some of the analytical results are shown in FIG. 5. It can be seen that for a fill time to reach a fill rate of 0.9 in 300 to 400 seconds, that the width of the metal hydride pocket should be in the range of twenty to fourteen millimeters. In FIG. 4, the bottom curves are the analytical results for the Ti—Cr—Mn composition, and the top line (labeled Asymptote) was for a different metal hydride material.

Various embodiments of the present invention incorporate a design philosophy that relates to a minimum size for a pocket of metal hydride. The configuration of the pocket is established by the cooling fins or other cooled structure that surround the pocket. It has been discovered that, in order to achieve a pressure vessel reasonably full of hydrogen in a commercially-acceptable period of time, that there is a minimum distance from the center of the pocket to the nearest cooled fin or cooling tube. Further, it is preferable that the length of the fins (the longest dimension of the fin) interconnect with other heat transferring fins or with the hub or an outer ring, such that no individual fin has a "dead end" that cannot flow heat along either of two opposing directions. An example of such a fin pattern can be seen in FIG. 4c, in which each of the individual fins 60 interconnect with either outermost connecting ring 68, a nodal intersection 66 or a hub 50.

Further analysis with a two dimensional model was performed, and the graphs of FIGS. 4a, 4b, and 4c represent some of those analytical results. As is best seen in FIG. 4c, temperatures during a hydriding reaction are shown as a function of time in three pockets of a finned plate (referring to the inset of FIG. 4c). FIG. 4c shows the predicted temperatures in the three pockets as a function of time, and also a calculated average temperature for the hydride. FIG. 4a shows the reaction rate within the three pockets (and also for the average) as a function of time. This figure shows that those pockets more distant from the central passages (such as pocket 3) achieve less progress in the hydriding reaction as a function of time. As can be seen in FIG. 4b, those most distant pockets also have generated heat loads later in time than pockets closer to the cooling passages (such as pocket 1).

FIG. 4d further shows the effects of contact resistance and convective coefficients on the time required to achieve a reaction progress factor of nine-tenths. The top line shows that for a convective coefficient of two-thousand W/m²K and a flowrate of about one and one-half liters per minute, ninety percent fill can be reached in about 770 seconds. The bottom line shows that for a convective heat transfer of ten-thousand W/m²K and a flow of about nine liters per minute, the time to reach ninety percent full is about 350 seconds. It can be seen that both contact resistance and the convective coefficient influence the performance of the heat exchanger. Generally, and in some embodiments, the convective coefficient has a more pronounced effect on heat exchanger design than contact resistance. However, for high values of contact resistance, the convective coefficient has to be increased correspondingly in order to achieve a desired fill time. Therefore, some embodiments of the present invention include features such as slotted, tapered sleeves to decrease the contact resistance between the hub and the coolant tube.

FIG. 1 shows an external view of a gaseous container assembly 20 according to one embodiment of the present invention. Container 20 includes a plurality of heat exchanger modules 21 that are generally surrounded with a gas absorbing material 22. In one embodiment, material 22 in some embodiments is any type of a metal hydride composition for storage of hydrogen. However, other embodiments of the present invention contemplate gas absorbing materials other than metal hydrides for storage of gases other than hydrogen. Further, various embodiments of the present invention contemplate the use of materials 22 that are in solid form, including powders.

In one embodiment, a quantity of gas 24 (such as hydrogen) is stored within material 22. The process of absorbing and desorbing the gas into the material is expedited either by the cooling (for absorption) or heating (for desorption). Therefore, various embodiments of the present invention contemplate the use of a heat exchanging medium (such as Dexcool®), although any fluid medium (liquid or gaseous) is contemplated. In some embodiments, container 20 further includes a material 28 that enhances internal thermal conductivity, such as an inert high conductivity powder 28.1 or a high conductivity mesh or lattice work, as examples.

The quantity of gas that can be stored within container 20 is increased by the use of higher pressure. Therefore, some embodiments contemplate that container assembly 20 includes a pressure vessel 30 preferably shaped so as to efficiently accommodate the pressure differential across outer wall 30.1, including shapes such as a cylindrical shape or a spherical shape. In some embodiments, the pressure vessel has about one-hundred bar across the outer wall of the pressure vessel. In yet other embodiments, the pressure vessel has a pressure differential of five-hundred bar across the outer wall. Because of the types of material, configurations, and thicknesses of material that must be used to accommodate such high pressure differentials, various embodiments of the present invention contemplate that the heat exchanging modules 21 within the pressure vessel do not have a substantial pressure differential across any part of the heat exchanging modules. Referring to FIG. 1, in one embodiment pressure vessel 30 is generally cylindrical having first and second ends 30.2 and 30.3, respectively, respectively, which can be spherically domed (not shown) to improve the distribution of stresses within the ends.

Figure 6:
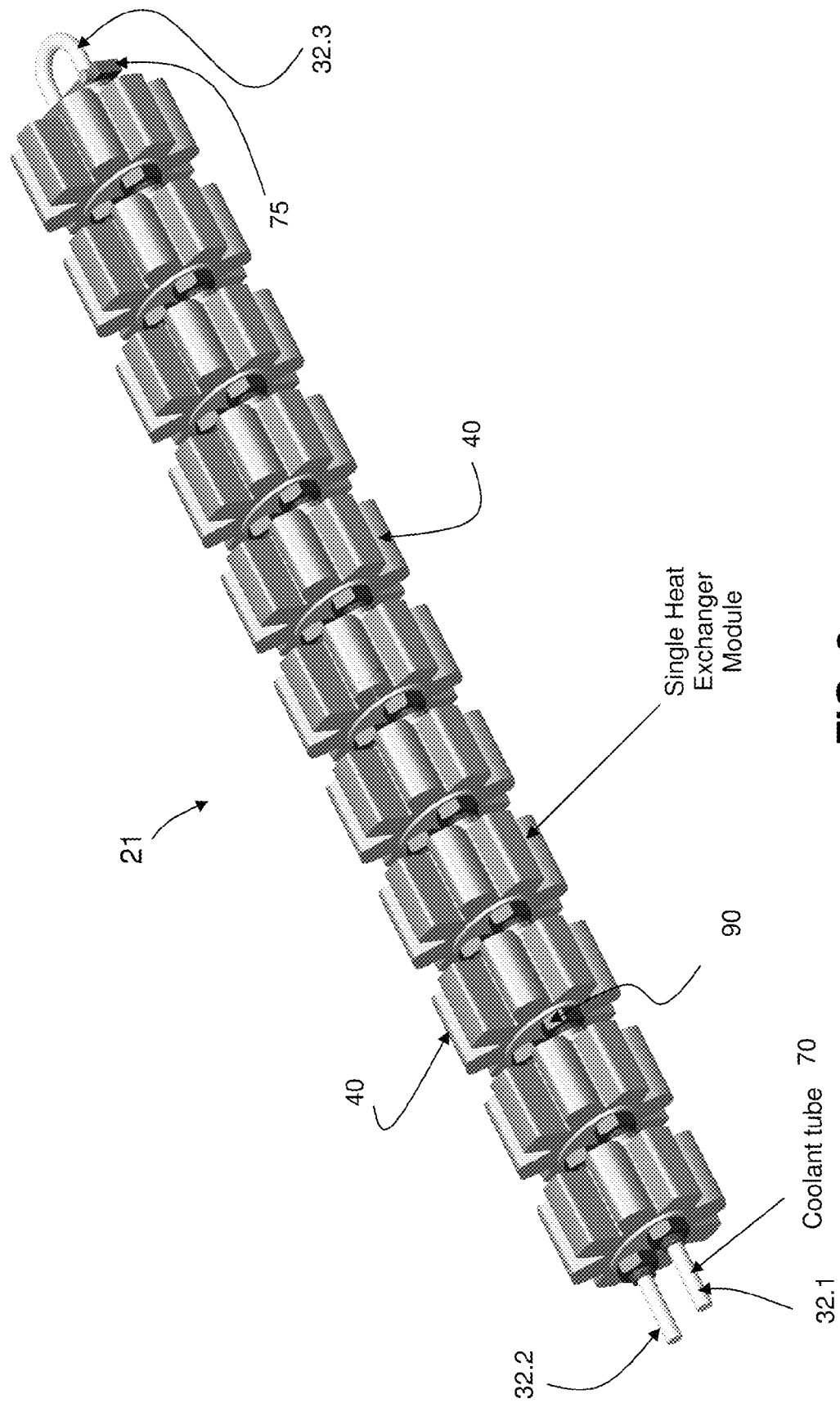
FIG. 6 is a perspective schematic representation of an assembled modular heat exchanger according to one embodiment of the present invention.
Figure 7:
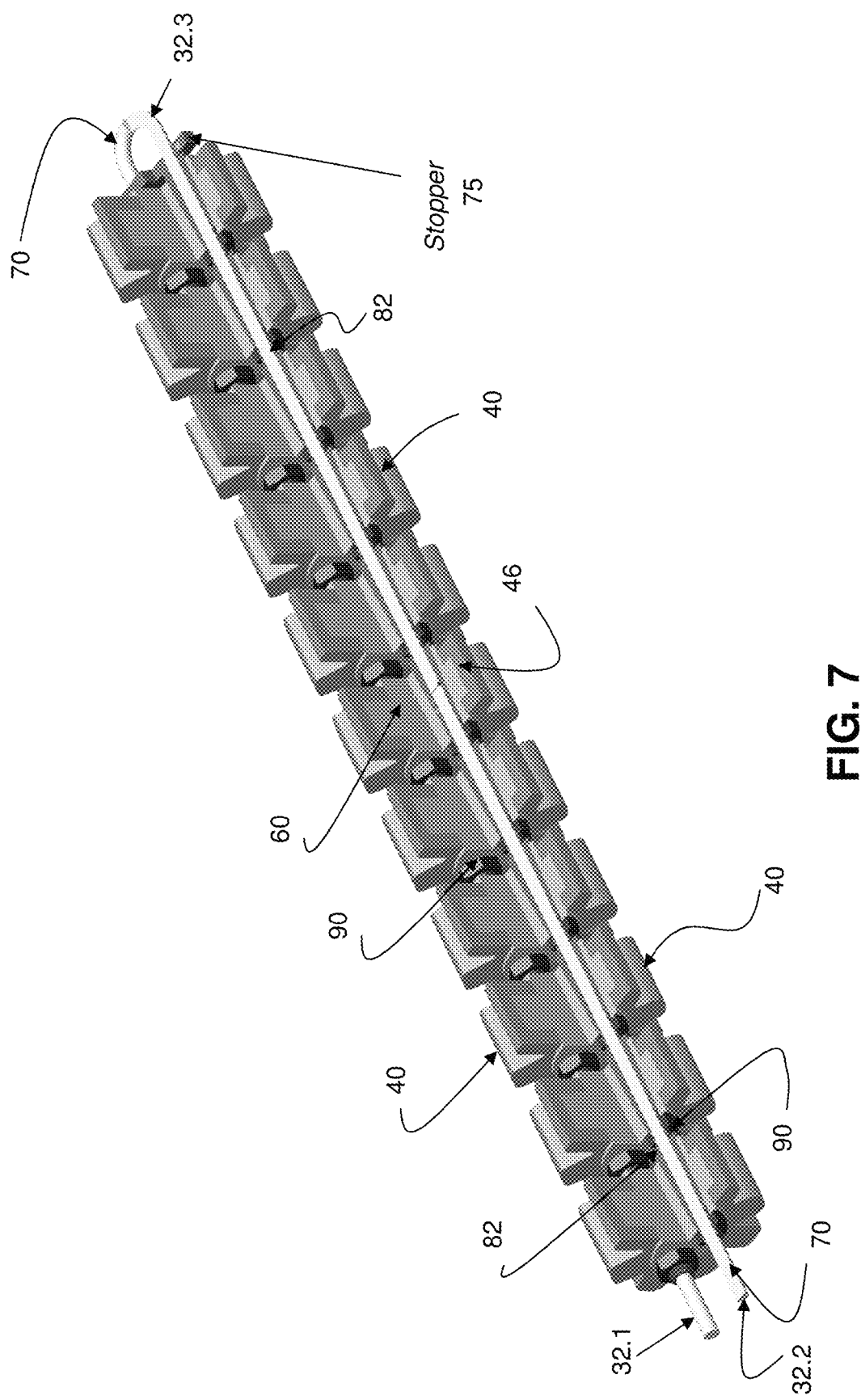
FIG. 7 is a partial cutaway of the apparatus of FIG. 6.
Figure 8:
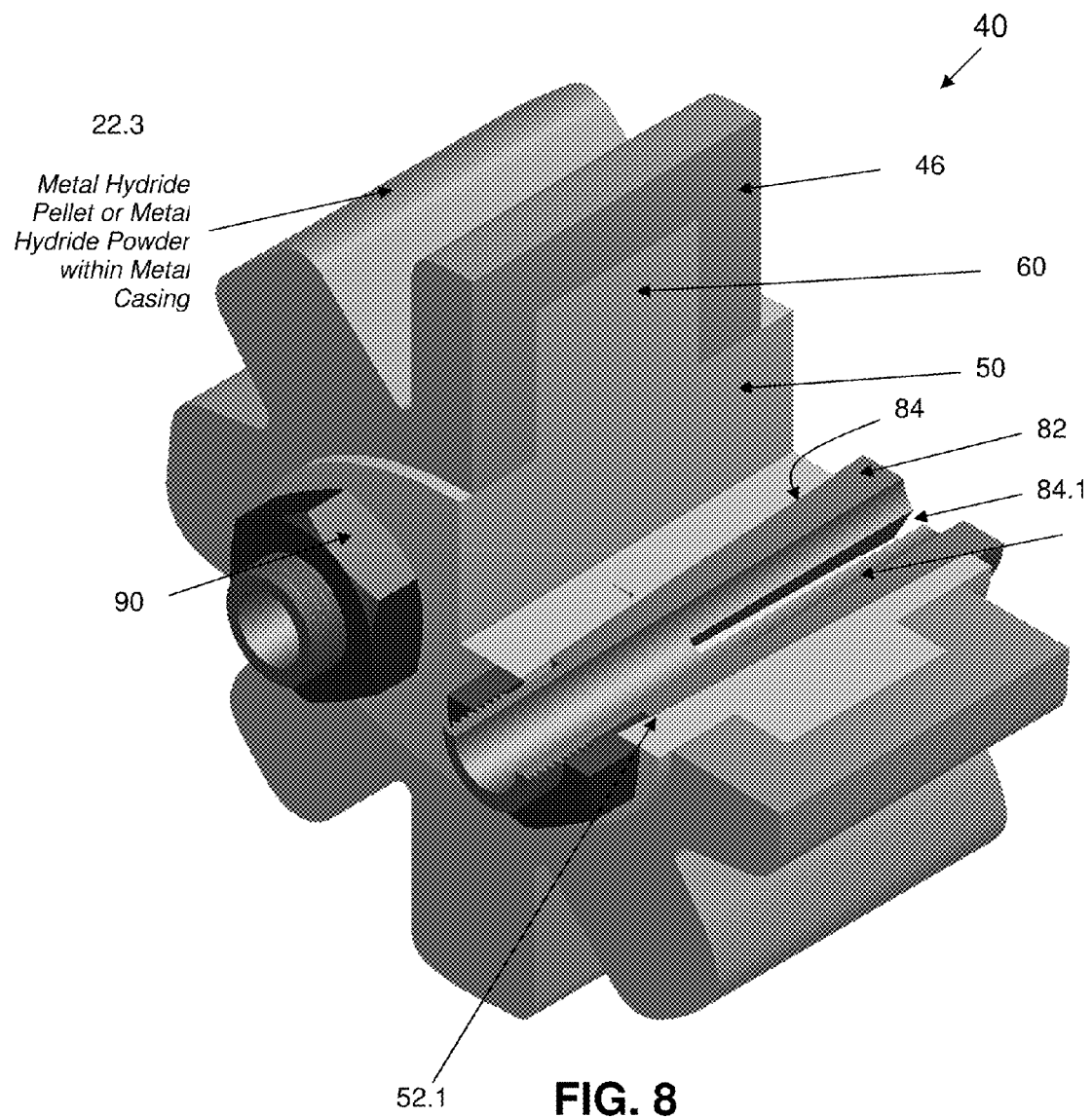
FIG. 8 is a partially cutaway, perspective schematic representation of a single heat exchanger from the assembly of FIG. 6.
Figure 11:
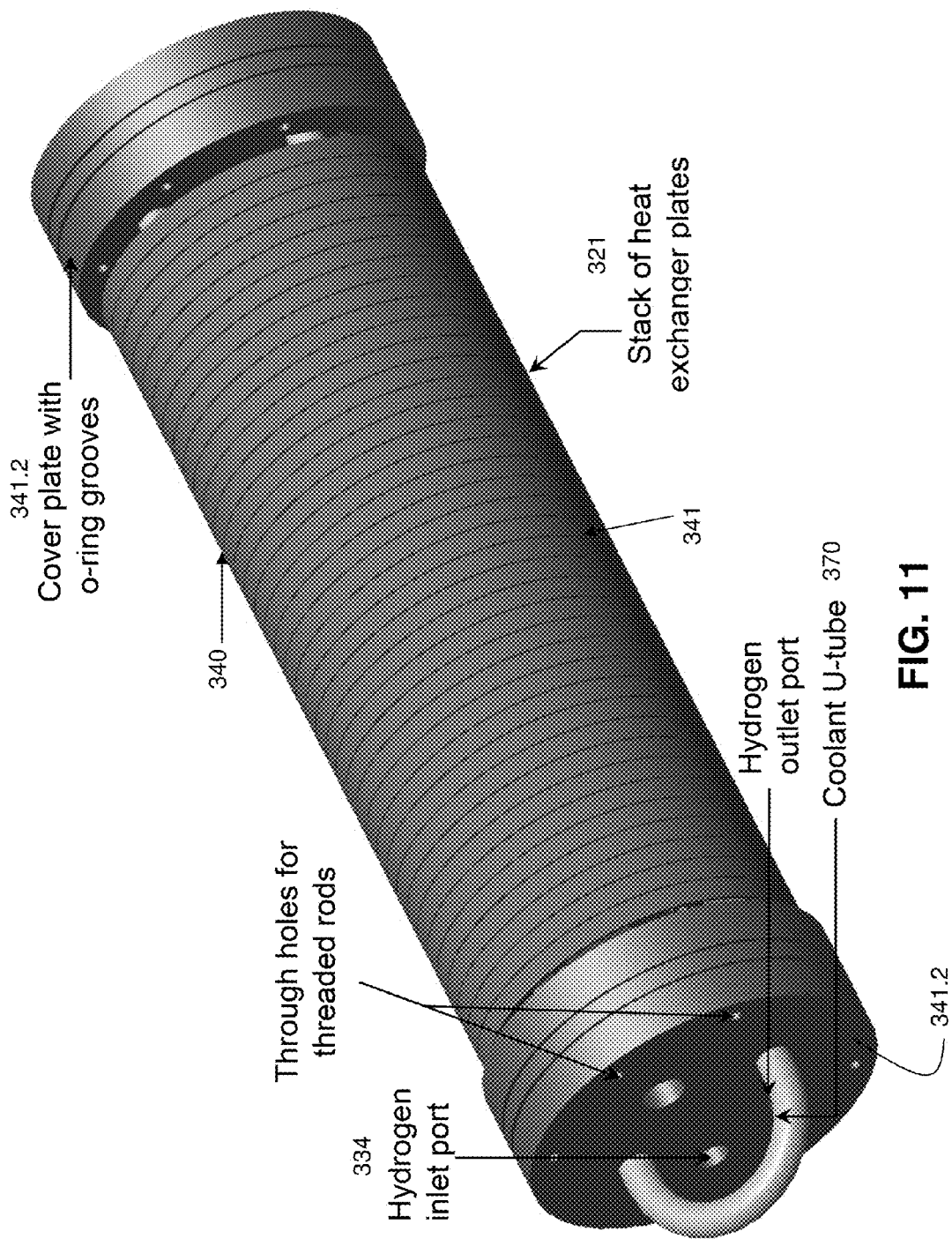
FIG. 11 is a perspective, 3-D representation of a portion the heat exchanging portion of a pressure vessel according to another embodiment of the present invention.

FIGS. 6 and 7 show schematics of a plurality of heat exchanger modules 21 for storage of gas in a porous material, such as storage of hydrogen within a metal hydride. The heat exchanger includes of a series of identical modules 40 that are cooled by liquid 26 pumped through a U-shaped tube 70. FIG. 8 shows a single module that includes of (i) metal hydride pellet 22.3 or metal hydride powder within a metal casing (not shown) that provides a collection volume for any loose hydride, (ii) a central metal hub 50, (iii) a pair of thermal sleeves 82, and (iv) a pair of fasteners 90 such as nuts.

The cooling tube 70 (as best seen in FIG. 7: omitted from FIG. 8 for clarity) passes axially through the center of the sleeve 82. The inner diameter of the sleeve is slightly larger than the outer diameter of the coolant tube. The exterior 84 of the sleeve is tapered and features slots 84.1 that provide compliance as the sleeve is slid through the hub. When tightened, the nut forces the sleeve to engage tightly with both the cooling tube 70 and metal hub 52.1, serving to reduce thermal contact resistance between the cooling tube and the hub.

Fins 60 extend radially outwards from the hub to increase contact surface area of the hub metal with the metal hydride pellet 22.3 or powder. A metal hydride pellet may be formed to fit the outer shape of the hub and fins in order to minimize contact resistance between the two materials. Alternatively, a metal case defining the outer shape of the hydride and generally surrounding heat exchanger 40 may be filled with metal hydride powder. FIG. 1 schematically shows a casing 41 surrounding a plurality of modules 40, and further located within the interior of pressure vessel 30. In some embodiments, casing 41 has relatively little or no pressure differential across it, and thereby can be constructed from thin material.

One purpose of the gear-shaped exterior of the metal hydride pellet or casing is to maintain metal hydride within a short distance from the surfaces of the metal fins. This short distance, along with the high thermal conductivity hub and fins, and conducting sleeve, serve to reduce the overall thermal resistance between the metal hydride and the liquid flowing through the cooling tube. Heat transfer effectiveness may be further enhanced by mixing high conductivity powder or metal mesh into the pellet or powder to enhance overall thermal conductivity of the metal hydride. More than one U-tube may be used depending on the inner diameter of the pressure vessel.

FIG. 8 shows a cutaway view further illustrating the construction of the heat exchanger. Assembly is initiated by clamping a stopper 75 toward the bent end 32.3 of the tube. A module is then slid along the cooling tube from the left until it touches the stopper. The module's nut is then tightened, forcing the module to be held tightly in place around the cooling tube. Tightening of the nut places sleeve 82 in tension. Tapered outer surface 84 of sleeve 82 is forced by this tension into more intimate contact with the inner diameter of the central passage 52.1. A second module is now slid along the cooling tube until it touches the first module. The second module's nut is tightened in the same manner. This process is repeated by stacking the rest of the modules.

FIGS. 9 and 10 show various additional cutaway views of the heat exchanger and its components. FIG. 9 shows a cross sectional schematic representation of a heat exchanger module 140 similar to module 40 shown in FIG. 8. One difference in the two modules is that module 140 includes a single central passage for a single cooling tube 170 through hub 150. Further, slotted sleeve 182 includes a plurality of fins 186 that extend radially outward into hub 150. These fins 186 are preferably spaced inbetween the localized area of weakening 184. Fins 186 assist in enlarging the effective surface area between hub 150 and sleeve 182 for the transfer of heat therebetween. FIG. 10 shows a cross sectional schematic representation of a heat exchanger module 240 similar to module 140, except that the metal hydride 222 surrounding fins 260 is not formed or compacted in the gear shape as hydride 122 is about fins 160.

Various embodiments of the invention shown and described herein can include one or more of various features. Some embodiments include a modular design that facilitates replacing defective modules. Yet other embodiments include a U-shaped tube with a plurality of modules on one or more legs of the U-shape. The U-tube in one embodiment carries coolant within a first set of aligned hub passages within the modules, changes flow direction at the U-passage, and then flows in the opposite direction in the other cooling passages of aligned cooling passages of the same hubs. In some configurations, the U-tube is contained within the pressure vessel as best seen in FIG. 1. In yet other embodiments, the U-return passage can be eliminated, such that there are two coolant ports at each end of the pressure vessel. In such embodiments, both cooling passages can be used to provide coolant flow in the same direction through the modules. Further, the coolant flowing out of one pressure vessel could be provided to another heat exchanger.

Sill further embodiments include adaptability to use with metal hydride pellets. Other embodiments include adaptability to use with metal hydride powder with the aid of the casing for containment of any loose powder. Some embodiments include shaping such as by sintering metal hydride to produce small distance of metal hydride from fin surfaces. In these embodiments the metal hydride can be formed around the finned structure of the hub, especially with the use of pressure in conjunction with a thermally conductive binding agent. Yet other embodiment include mixing high conductivity powder or metal mesh into the pellet or powder to enhance overall thermal conductivity of the metal hydride.

Yet other embodiments include the use of a high thermal conductivity hub with fin structures to enhance thermal contact between the metal hydride and the hub. As shown in FIGS. 8, 9, and 10, the fins can be simple linear shapes that extend radially outward from the hub. However, other embodiments of the present invention are not so constrained, and contemplate any shape or number of fins in thermal contact with the hub. Preferably, the cross sectional shape of the hub and fins is one that is amenable to an extrusion or casting process for fabrication of the hub and fins.

Still further embodiments include the use of metallic thermal sleeve to reduce contact resistance between sleeve and both the cooling tube and the metal hub. Preferably, the sleeves are deformable to reduce the contact resistance. In some embodiments longitudinal slots are cut along a portion of the length of the sleeve. In yet other embodiments a soft, malleable material is placed in between the hub and the outer surface of the sleeve to reduce contact resistance.

Some embodiments include the use of a stopper to facilitate desired placement of modules along cooling tube. Still other embodiments include the ability of heat exchanger to accommodate thermal expansion and contraction because of the use of the U-tube.

FIGS. 11-14 provide 3-D renderings of a heat exchanger assembly 321 according to another embodiment of the present invention. Assembly 321 includes an aligned and stacked assembly of heat exchanger modules 340. Each module 340 includes a plate 349 comprising one or more hubs 350 and outer connecting ring 368 interconnected by a plurality of fins 360. Each plate preferably includes central passages 352.1 and 352.2 for transferring heat into a flowing medium.

A single coolant U-tube 370 runs across the length of the heat exchanger. A tapered collet 382 with 3 slots at 120° each across its length is mounted on the coolant tube. The collet has an opposing taper extending from the middle toward both ends such that the center has a maximum diameter while both ends have a smaller diameter. As compared to having a continuous taper in a single direction, this bi-directional taper helps in reducing the thickness of the collet. Each heat exchange plate 349, depending on its location, has a taper complementing the taper of the collet. In some embodiments, each plate 349 has central passages 352 within their hubs 350 that are appropriately tapered for the location of that particular plate 349 along the length of sleeve 382. This provides good contact between the coolant tube and collet as well as the collet and heat exchanger plates 349. The plates are then stacked together and sealed on both ends by the cover plates 341.2. The threads on each end of the collets provide for compressing the plates against each other axially and also against the collet radially by tightening the collet nut. A thin metal sleeve 341 then slides over the assembly, providing additional sealing from the environment and containment of any loose hydride material.

Figures 13A, 13B:
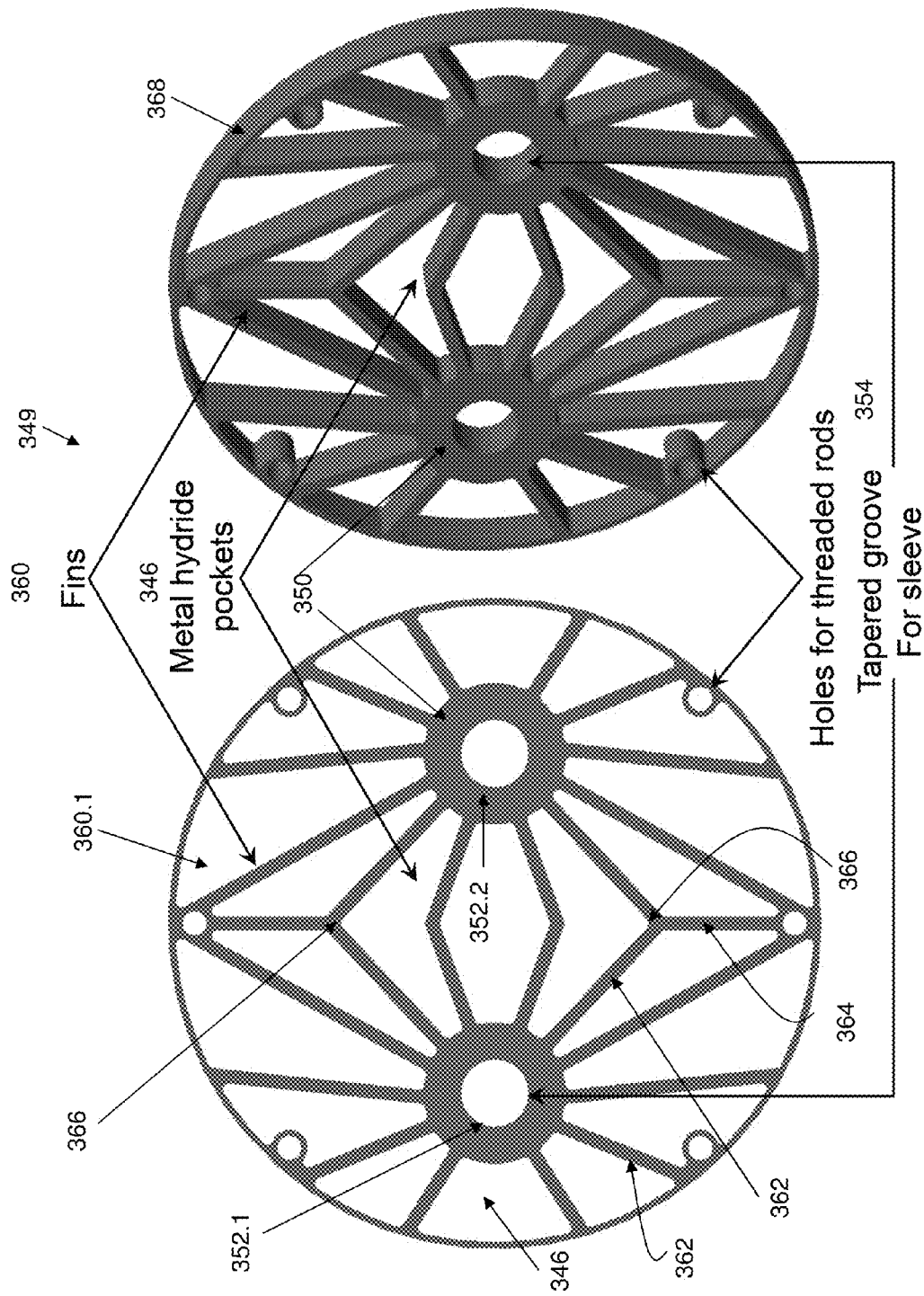

Referring to FIGS. 13a and 13b, preferably the individually plates 349 within the stack 321 have a pattern of fins 360 and one or more hubs 350 that can be extruded. Preferably, each plate 349 is extruded from a material such as aluminum, although various embodiments of the present invention contemplate the use of any material with acceptable heat conduction. Further, although stack 321 preferably includes a plurality of extruded plates 350.1 arranged to form a cylindrical assembly, other embodiments of the present invention include a heat exchange module such as module 340 that comprises a single extruded cylindrical shape having an internal pattern of fins 360.1 and at least one hub 350.

Figure 12:
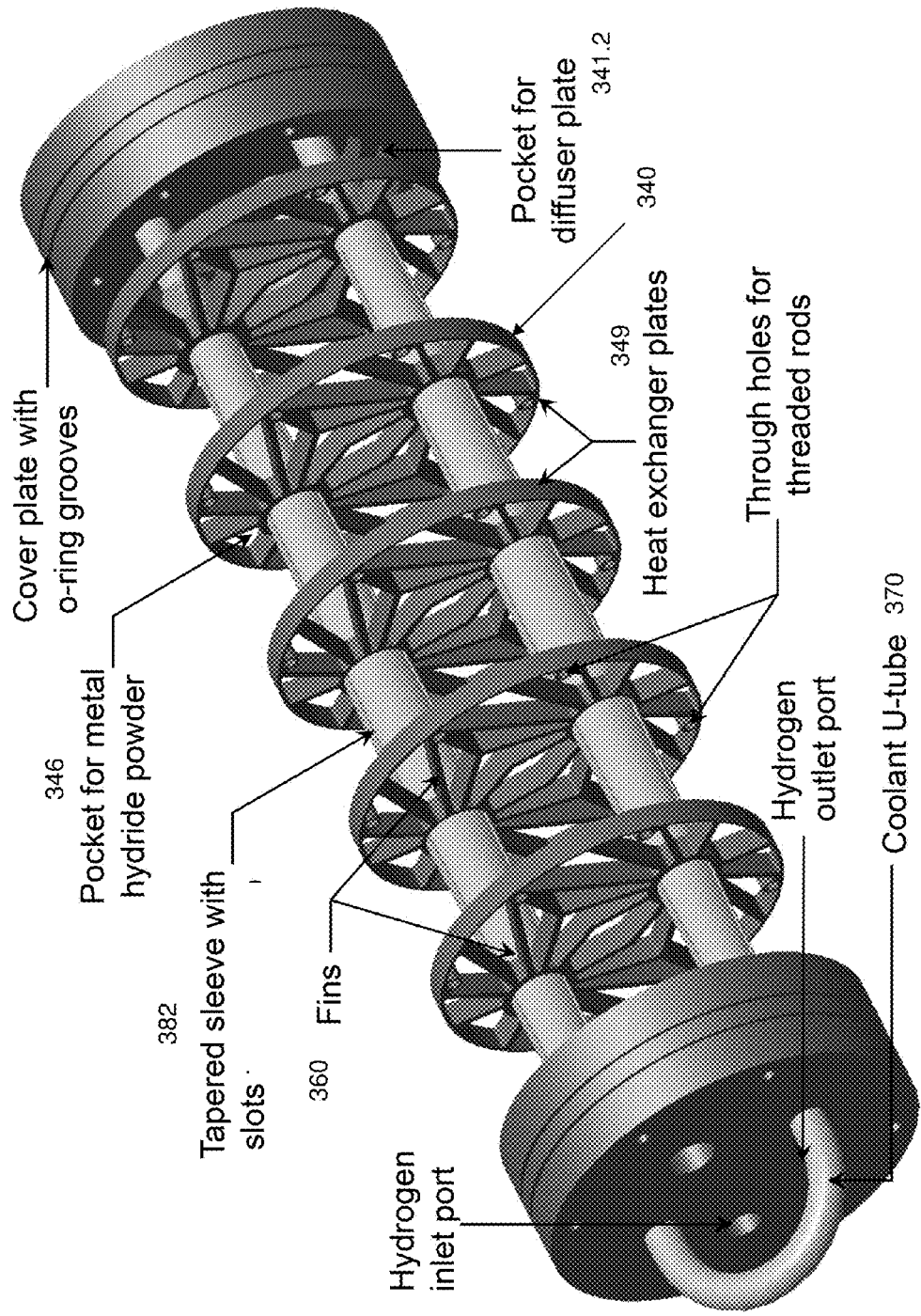
FIG. 12 is a view of FIG. 11 with some of the finned plates removed to show internal details.

Referring to FIG. 12, the stack 321 of heat exchanging modules 340 preferably includes a pair of tapered sleeves 382, each extending through the central passage 352 defined by hub 350. In one embodiment, each plate 350.1 includes an inlet passage 352.1 and an outlet passage 352.2, each defined within a respective hub 350.

Module stack 321 further includes a tube assembly 370 extending through each tapered sleeve 382 and in intimate contact with the inner diameter of the respective tapered sleeve. In one embodiment, tube assembly 370 includes a "U" connection at one end linking the inlet flowpath to the outlet flowpath, although other embodiments of the present invention contemplate a single, straight-through cooling path, and also multiple, straight-through cooling paths.

Module stack 321 includes a pair of cover plates 341.2, each located at a respective end of the cylindrical assembly of the plurality of modules 340. In some embodiments, these cover plates provide pockets into which gaseous hydrogen diffuses during desorption. In other embodiments, these cover plates include grooves in which O-rings are inserted and by which a seal can be achieved to minimized the physical movement of the powdered hydride out of the stack 321. Preferably, stack 321 is contained entirely within a pressure vessel, such that there is little or no pressure differential across the circumferential ring 368 that interconnects the ends of the cooling fins 360, Referring to FIGS. 12 and 13, each heat exchanger assembly 340 preferably includes a plate 350.1, and a quantity of metal hydride material located within each pocket 346. For the sake of simplicity, the metal hydride material is not shown in FIG. 12 or 13. In one embodiment, the pockets 346 or each plate 350.1 are filled with loose powdered hydride after the stack of plates 350.1 have been placed in intimate contact with each other, face-to-face. However, the present invention is not so limited, and contemplates the placement of hydride material within a pocket 346 by any method.

Referring to FIG. 13a, the plate 350.1 includes a pattern 360.1 of fins adapted and configured such that the furthest distance from a fin to the center of a pocket does not exceed about twenty millimeters, and in some embodiments does not exceed fifteen millimeters. It has been found that to achieve this spacing, pattern 360.1 includes a pair of nodal points 366 that interconnect primary and secondary fins 362 and 364, respectively. FIG. 13a shows two modal points 366, arranged symmetrically (along with the finned pattern 360.1) about a horizontal centerline extending through the central line of central passages 352.1 and 352.2. Each modal point 366 interconnects a secondary fin 364 with a pair of primary fins 362. As used herein, a primary cooling fin is in direct contact with a hub 350. A secondary fin is not in contact with a hub, but instead is connected to other secondary fins or primary fins. Fin pattern 360.1 can be seen to include a pair of modal points 366 and a pair of secondary fins 364.

Figure 14:
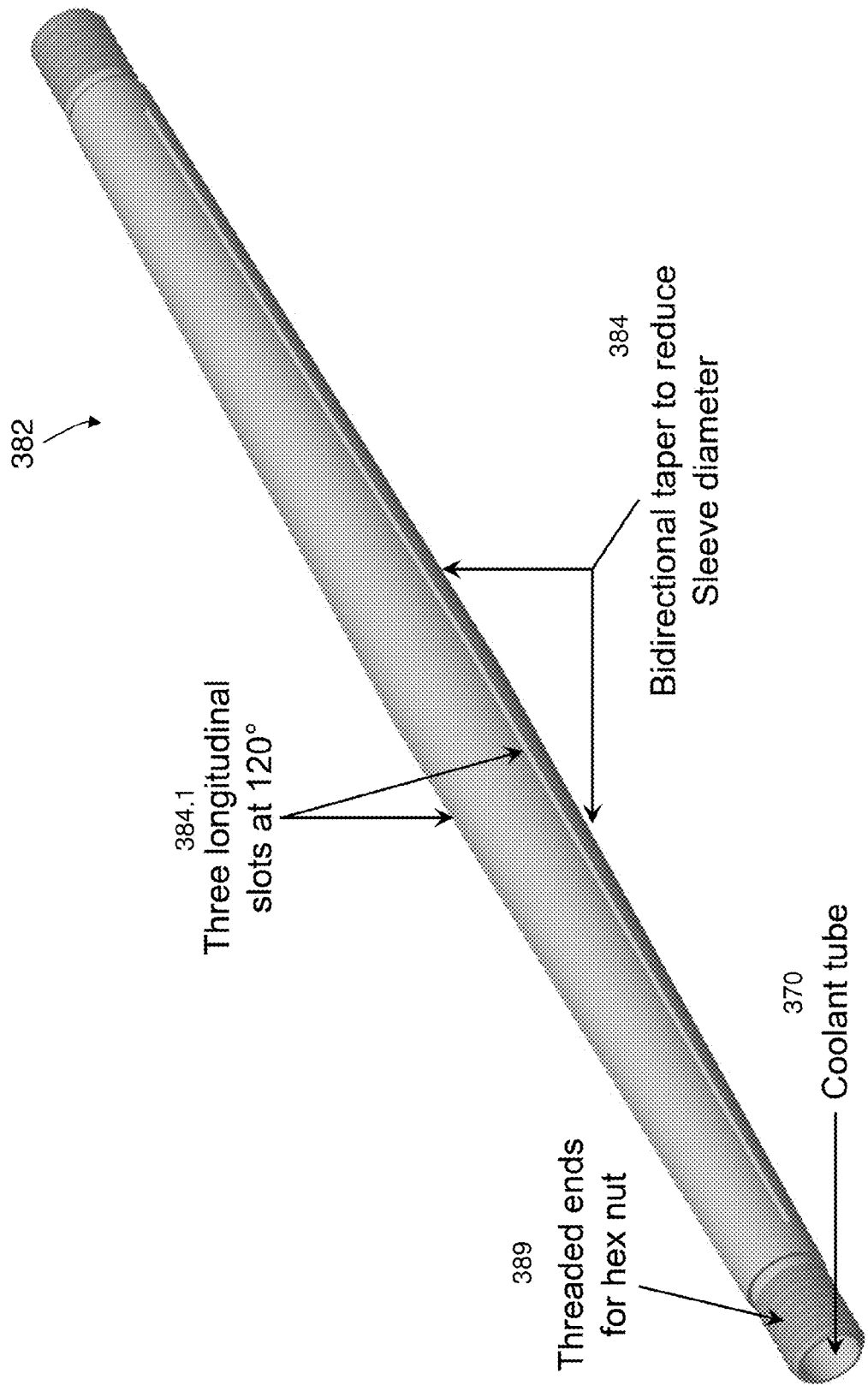
FIG. 14 is a perspective 3-D representation of a tapered and deformable sleeve from the apparatus of FIG. 11.

Referring to FIG. 14, a tapered sleeve 382 according to one embodiment of the present invention is shown. Tapered sleeve 382 includes a bi-directional taper 384 that has a maximum outer diameter in between the ends of the sleeve, and tapers from that maximum diameter to smaller outer diameters toward the threaded ends 389. As shown in FIG. 14, tapered sleeve 382 has a maximum outer diameter at the center, but the present invention is not so constrained and contemplates a bi-directional taper in which the maximum outer diameter is placed anywhere along the length the sleeve 382. Further, other embodiments contemplate a tapered sleeve in which the maximum outer diameter is adjacent to a threaded end 389, and extending to a minimum outer diameter at the other end of the sleeve. Further, it is understood that the threaded ends 389 can be used for coupling with a female threaded connector such as a nut, but the present invention is not so limited, and contemplates those embodiments in which other devices are used to apply compression to the stack of plates 349 placed along the length of sleeve 382.

The bi-directional taper of sleeve 382 permits this sleeve to have a smaller maximum outer diameter for a specific taper than a different sleeve having a unidirectional taper. For the case of a unidirectionally-tapered sleeve, the same amount of taper would result in an outer diameter that is about twice the outer diameter at the center of the bi-directionally-tapered sleeve shown in FIG. 14.

Sleeve 382 includes a plurality of slots 384.1 placed along the length of the sleeve. These slots provide a localized weakening in the compressive stiffness of the cross-sectional properties of the sleeve. Therefore, as plates 350.1 are stacked on a sleeve from one end toward the middle of the sleeve, the tightening of the fastener onto threaded end 389 places the assembled stack of plates in compression such that the hubs of the plates compress the tapered outer diameter of the sleeve. This compression of the inner diameter of the plate hub 350 against the outer diameter of the sleeve 382 results in localized deformation of the sleeve along the slots, such that the sleeve I.D. comes into intimate contact with the sleeve O.D., and a reduction in thermal contact resistance is achieved.

The filling procedure of the heat exchanger 320 is as follows. Metal hydride that is already activated is reactive to air and moisture. Hence the filling process is carried in an inert atmosphere of Argon gas in a box. The heat exchanger plates can be stacked vertically in groups of 6-8. After fixing the plates to a sturdy base, metal hydride powder can be poured in the pockets and then compressed using dies (in the shape of the pockets) until the desired amount of powder is filled. This process is continued until all the plates of the heat exchanger were filled.

Non-activated metal hydride powder can be filled in the heat exchanger and the powder can then be activated. Furthermore, the metal hydride powder could also be sintered to the shape of the heat exchanger fins, thereby increasing contact between the two. Preferably on each end of the heat exchanger filter paper is placed to seal metal hydride powder while still allowing hydrogen gas to flow. A small porous disk is also preferably placed at each end of the heat exchanger. This acts as a diffuser plate for hydrogen gas and helps in spreading the hydrogen gas from the inlet port to all the pockets of the heat exchanger.

Figure 15:
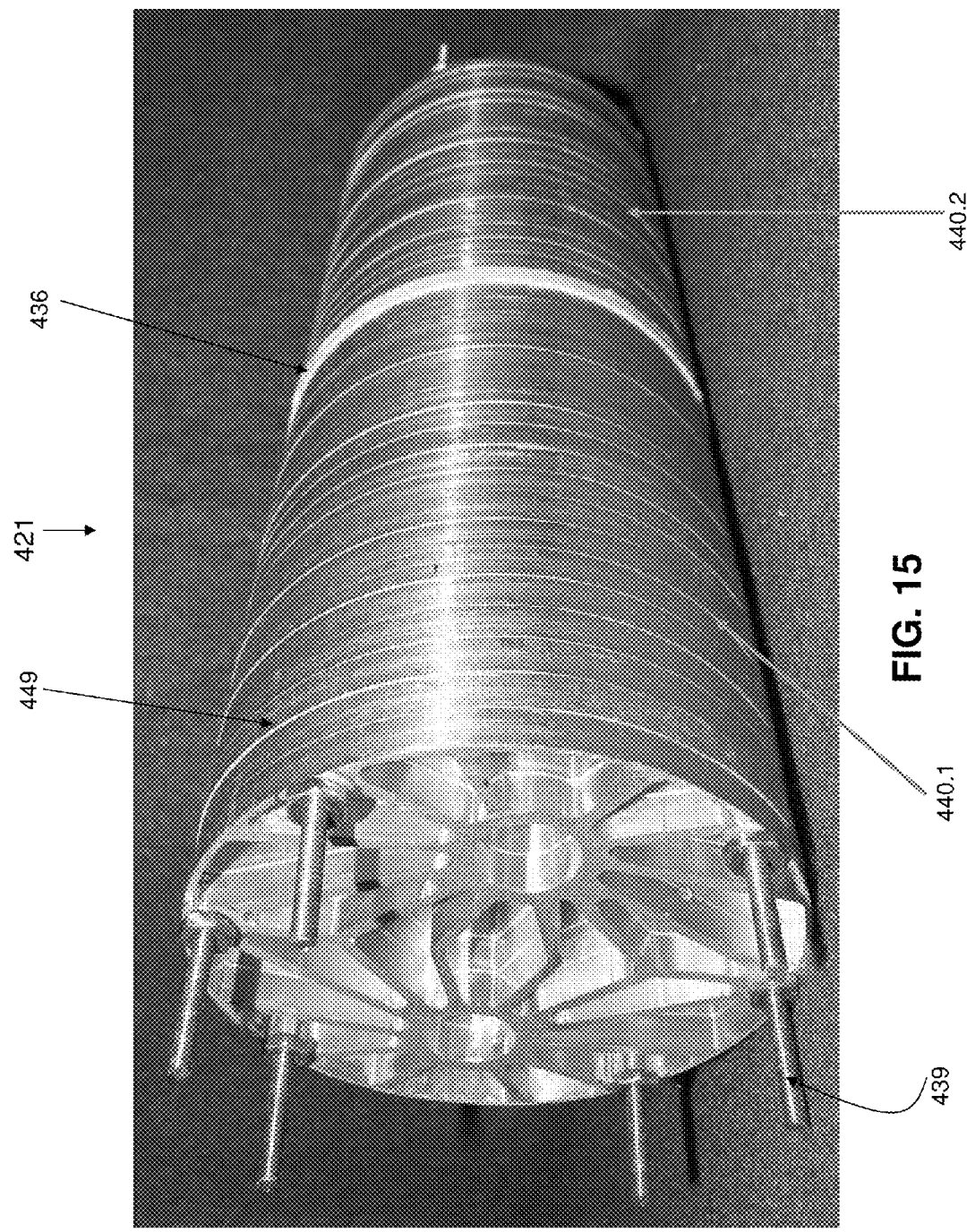
FIG. 15 is a perspective photographic representation of a heat exchanging assembly according to another embodiment of the present invention.
Figure 16C:
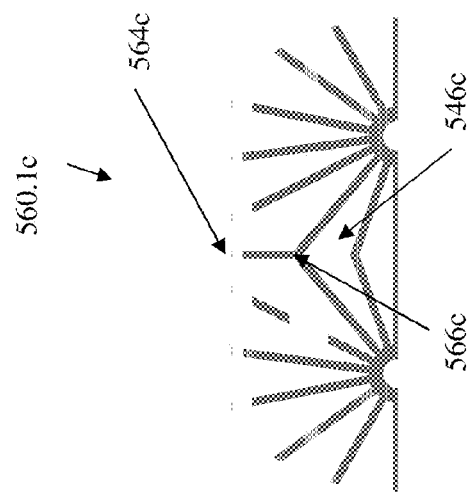
FIGS. 16 (a, b, and c) are half-section plan views of finned plates, each according to a different embodiment of the present invention.
Figure 16B:
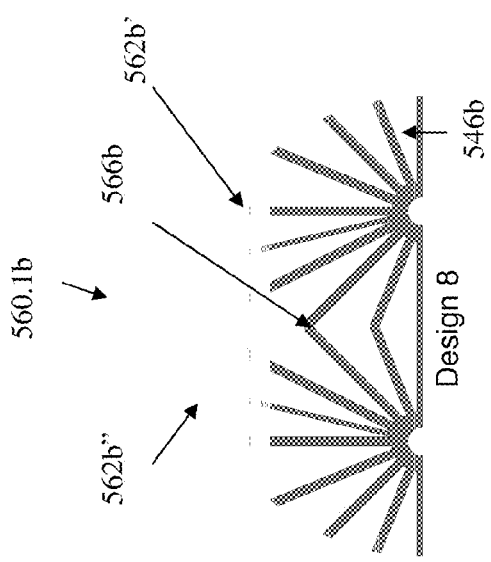
Figure 16A:
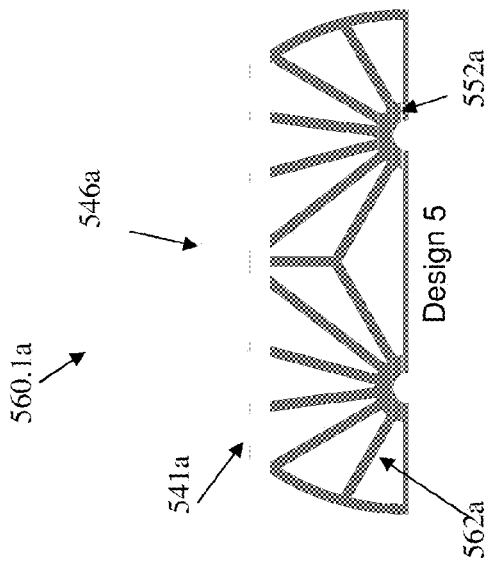

FIG. 15 is a photograph of a module stack 421 according to another embodiment of the present invention. Module 421 is similar to module 321, except that it includes a compressible intermediate plate 436 placed generally in the center of the stack. As the plates 449 are placed on the pair of tapered sleeves 482 (not shown in FIG. 15), the plates are compressed toward each other, and further against the outer diameter of the tapered sleeves, by a pair of threaded nuts 490 (not shown in FIG. 15). As the nuts are tightened, the plates 449 slidingly move along the outer surface of the tapered sleeves, and this axial movement results in compression of intermediate plate 436.

Intermediate plate 436 provides a means for keeping compression within the assembled stack of plates 449, yet further allowing for thermal expansion and contraction in the axial direction. Preferably, intermediate plate 436 is fabricated from a resilient material, such as a plastic or an elastomeric material. However, the present invention is not so constrained and further contemplates an intermediate plate fabricated from aluminum or other metal, but having one or more spring members oriented to permit movement in the axial direction. As one example, an intermediate plated according to another embodiment of the present invention contemplates a pair of rings, with one ring guided by another ring, and with a spring such as a wavy spring or a plurality of coil springs located around the circumference. As one example, one ring of this intermediate plate assembly could be guided on to the other plate by axially-arranged guiding pins, or by having one plate having an inner diameter that rides along an extended guiding surface of the other ring. This spring loaded assembly of rings likewise provides a means for maintaining the assembled stack in compression while providing for axial thermal expansion or contraction.

In FIG. 15 all the machined heat exchanger plates are stacked and bolted together to form the heat exchanger. In one embodiment there are 40 plates in total, 20 on each side of the collet. There is a plate 436 made from Teflon at the center. Teflon being flexible and easily compressible, serves in reducing the non-conformities between the tapers of heat exchanger plates and the collet and providing better thermal contact, as the assembled stack expands and contracts.

FIGS. 16-20 show a variety of designs of the heat exchanger fin network according to various embodiments of the present embodiment. The position and thickness of the fins (ribs) can be modified depending on the properties of different metal hydride powder, especially to maintain a short fill time for the hydrogen gas, such as 300 seconds. Some features of the design can include that the fins originate from the interface of the plate and the coolant tube. This helps achieve high heat transfer rates, and also increases mechanical strength. Some embodiments include that the pocket sizes vary depending on location with respect to the coolant tube. Pockets closer to the coolant tube are generally larger than the ones away from the coolant tube. This can be helpful when designing heat exchanger of larger sizes. Still other embodiments include that all the fins interconnect the coolant tubes and the outer rim. The outer rim helps in containing the powder within the heat exchanger and also serves as additional heat transfer route.

FIGS. 16, 17, 18, 19, and 20 show various half-section patterns of fins according to different embodiments of the present invention. Generally, each of these shapes is extrudable, in that they are two dimensional shapes. Each of them shows a plurality of primary fins X62 radiating from either one of two central passages X52.1 or X52.2. Further, some patterns X60.1 includes at least one secondary fin X64 that does not come into contact with a central passage as a primary fin does. Further, the secondary fins are coupled to a primary fin or another secondary fin by a modal point X66. FIG. 16c shows a pattern 560.1c that does not include an outer ring 41 (such as the containment ring 541a shown in FIG. 16a). FIG. 16b shows a containment ring 541b that is substantially thinner than any of the fins 560b. Further, FIG. 16b is shown to have two primary fins 562b" that is about one-half the thickness of adjacent rib 562b'.

Fin pattern 660.1a of FIG. 17a can be seen to have four secondary fins 664a that extend from a point on one side of containment ring 641 to a mirror image point on the other side of ring 641a, and including a central modal point 666a that is a juncture of two primary fins 662a and four secondary fins 662a. Further, it can be seen that in all of the fin patterns 660.1 the pockets 646 thereby defined are substantially triangular in shape.

Figure 18A:
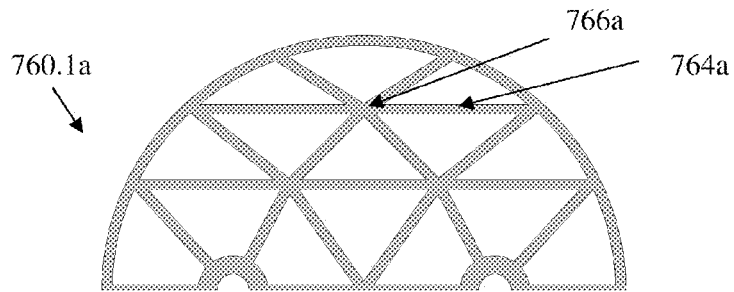
FIGS. 18 (a, b, c and d) are half-section plan views of finned plates, each according to a different embodiment of the present invention.
Figure 18B:
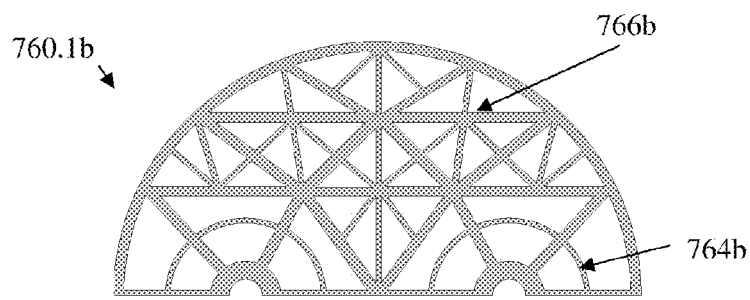
Figure 18C:
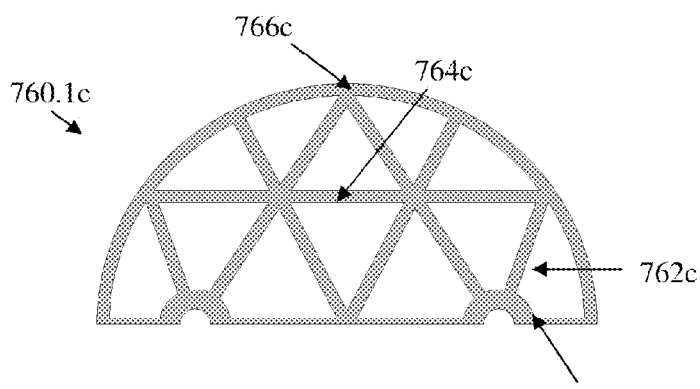
Figure 18D:
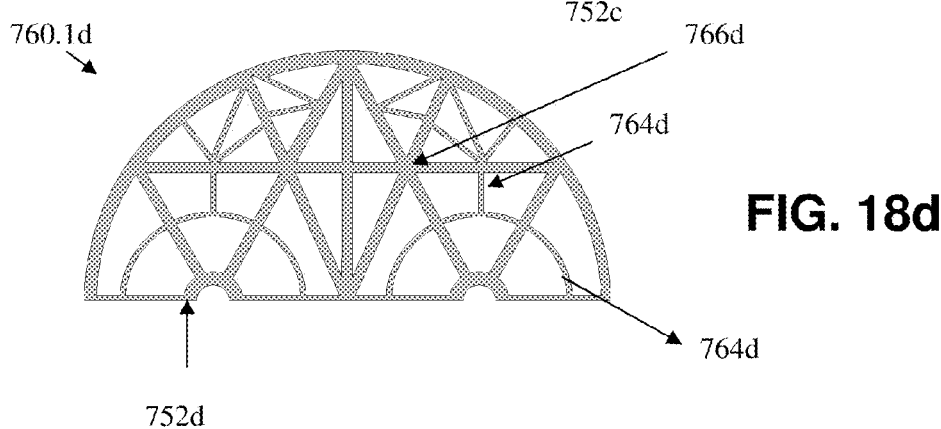
Figure 19A:
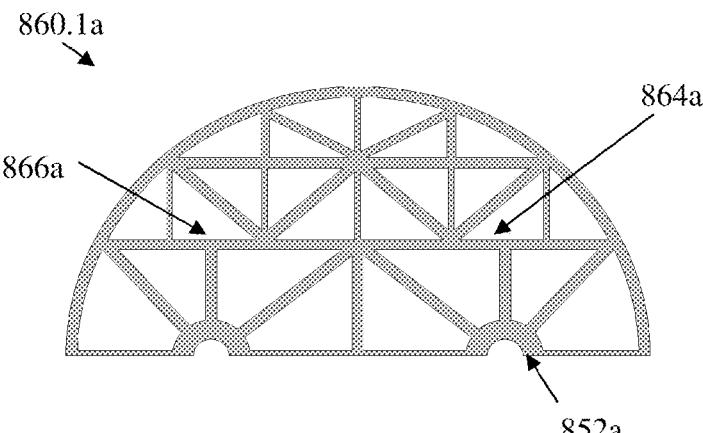
FIGS. 19 (a, b, c and d) are half-section plan views of finned plates, each according to a different embodiment of the present invention.
Figure 19B:
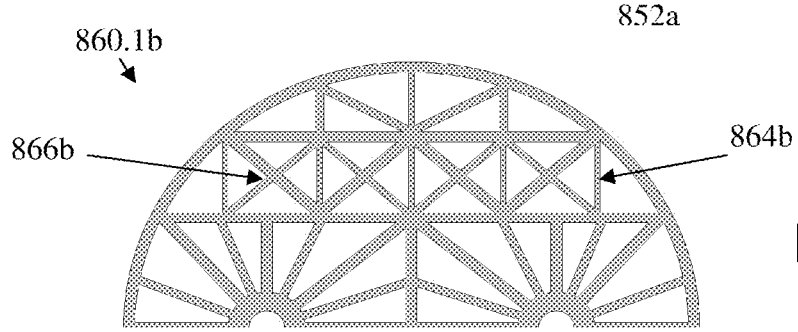
Figure 19C:
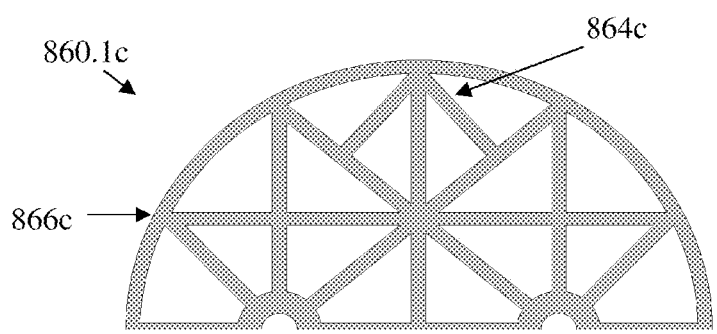
Figure 19D:
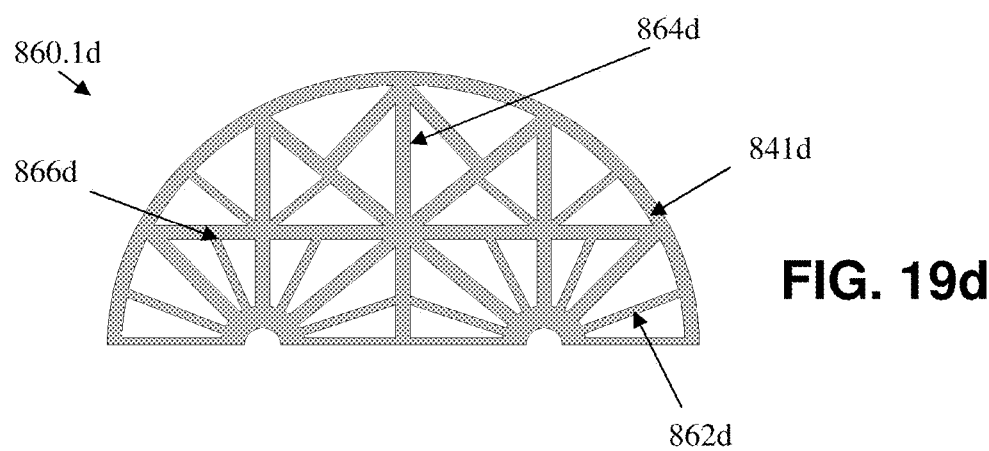
Figure 20A:
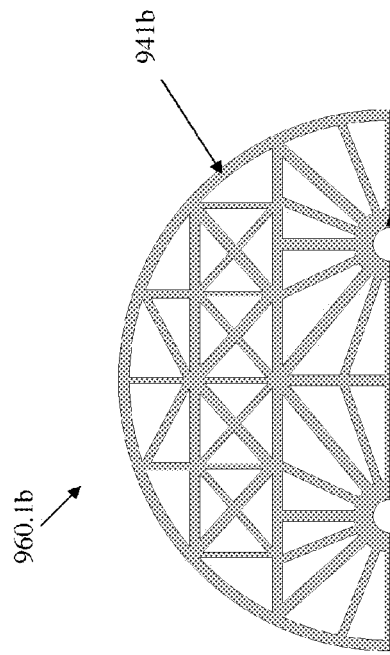
FIGS. 20 (a, b, c and d) are half-section plan views of finned plates, each according to a different embodiment of the present invention.
Figure 20B:
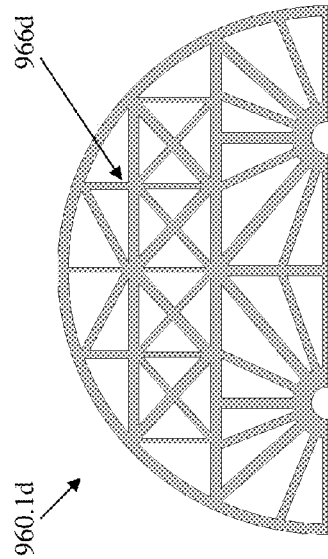
Figure 20C:
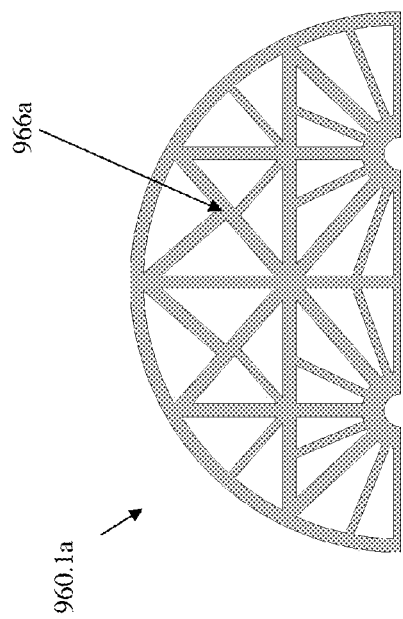
Figure 20D:
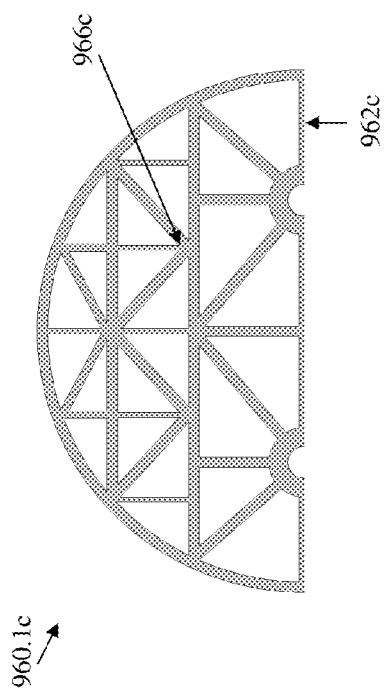

FIGS. 18b and 18d include secondary fins 764b and 764d, respectively, which are substantially concentric with a corresponding central passage 752b and 752d. Each of the finned patterns shown in FIGS. 18, 19, and 20 further include at least one arrangement of co-linear secondary fins (764, 864, and 964, respectively) that extend from left to right and substantially parallel to a line joining the centerpoints of the corresponding central passages. FIGS. 18a, 18b, 19a, 19b, 20b, 20c, and 20d further include a second substantially co-linear arrangement of secondary fin X64 that is substantially parallel to the aforementioned co-linear arrangement of secondary fins.

Figure 21:
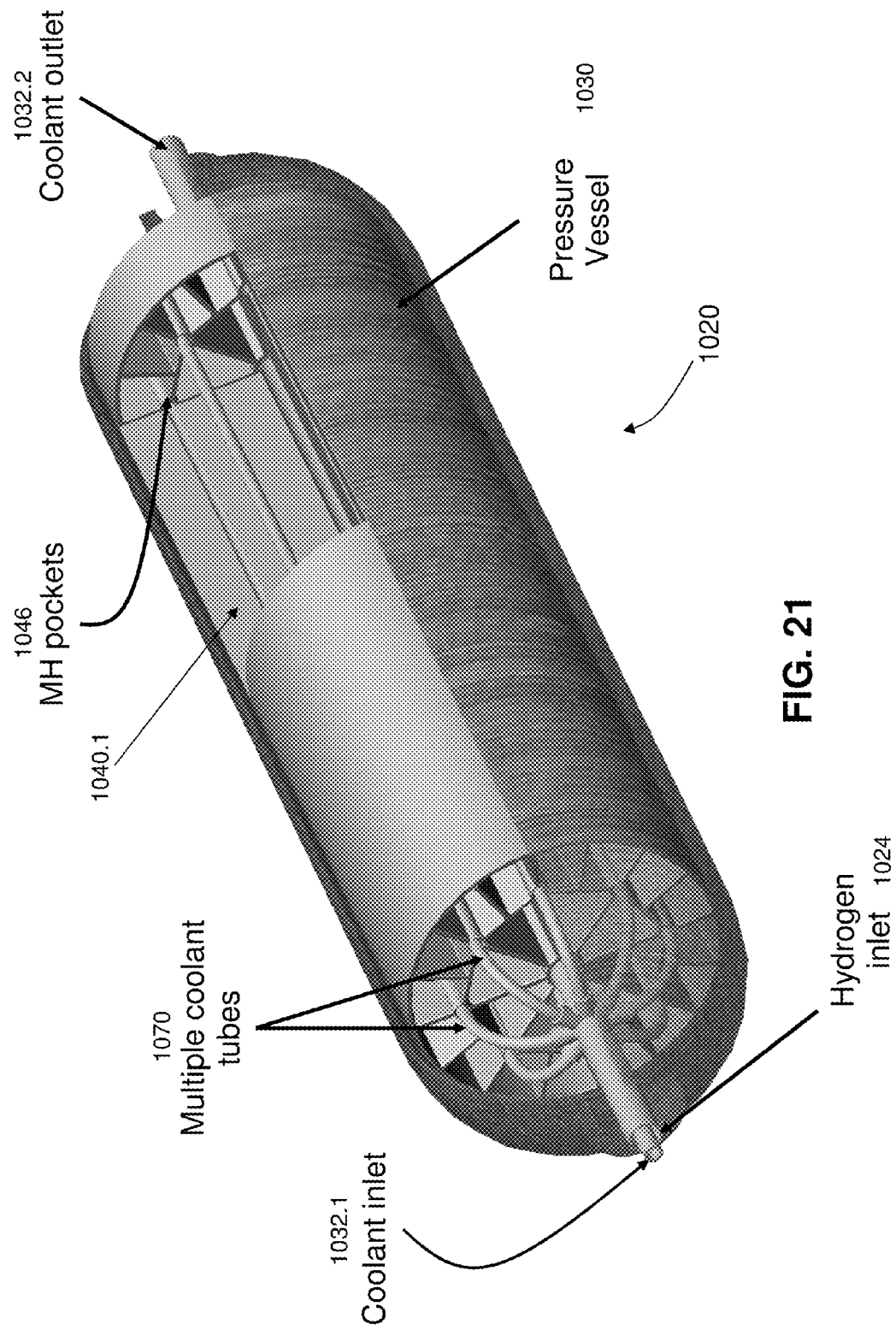
FIG. 21 is a 3-D, perspective, cut away, partially transparent representation of a pressure vessel according to another embodiment of the present invention.

FIG. 21 shows a conceptual drawing of a heat exchanger 1020 according to another embodiment of the present invention. The previously discussed ideas are expanded to a larger size to accommodate more metal hydride powder and coolant tubes. In this design, multiple coolant tubes branch out from a single central coolant line. This minimizes the complexity and cost of multiple inlet and outlet ports. Due to multiple tubes, a greater amount of metal hydride can be cooled during hydriding in a single pressure vessel. This could reduce the number of pressure vessels.

FIG. 21 is a perspective representation of a gaseous container assembly 1020 according to another embodiment of the present invention. Assembly 1020 includes a coolant inlet 1032.1 that communicates with an outlet 1032.2 in a generally straight, flow-through flow path 32. In some embodiments, the single, central inlet 1032.1 branches into a plurality of multiple coolant tubes 1070 that extend through hubs of an extruded module 1040.1. These multiple tubes are gathered together in a manifold at the other end of assembly 1020 and flow out of the outlet 1032.2. Further, yet other embodiments of the present invention contemplate the internal coolant tubes being arranged with multiple "U" connections, such that the coolant passes axially back and forth one or more times after entering the inlet and before exiting the outlet.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for exchanging heat between a medium and a substance, comprising:
    a pressure vessel having a first port for receiving a heat exchanging medium and a second port for returning the medium and a flowpath therebetween, said pressure vessel defining an interior;
    a plurality of heat exchanging modules within the interior, each said module being in fluid communication with the flowpath, each said module including:
    a hub, said hub having a central portion with first and second passages each extending through the central portion, each said passage having a tapered inner wall, said hub having a plurality of fins extending outwardly from the central portion, the substance being in thermal communication with the exterior of said fins;
    a pair of sleeves each having a tapered exterior, each said sleeve being received in a different one of said passages;
    wherein the flowpath extends through said sleeves.

2. The apparatus of claim 1 each said sleeve being adapted and configured to deform during insertion of the sleeve into a passage and to fit tightly to the interior of the respective passage.

3. The apparatus of claim 1 each said passage being adapted and configured to deform during insertion of a sleeve into the passage and to fit tightly to the exterior of the respective sleeve.

4. The apparatus of claim 1 wherein said module further comprises a pair of fasteners, each said fastener coupled to one of said hub or said sleeve and abutting against the other of said hub or said sleeve, each said fastener applying a force on said sleeve relative to said hub that tightens the tapered inner wall against the tapered exterior.

5. The apparatus of claim 1 which further comprises a tube extending from the first port through a second plurality of sleeves, and the flowpath is through the tube.

6. The apparatus of claim 1 which further comprises a containment vessel placed within the interior for minimizing the movement of the substance within the pressure vessel, wherein said heat exchanging modules are located within said containment vessel.

7. The apparatus of claim 1 wherein the pressure vessel is pressurized with gas such that a pressure differential of more than about 100 bar is placed across the walls of said pressure vessel.

8. An apparatus for holding a compressed gas, comprising:
    a pressure vessel having a first port for receiving a heat exchanging medium and a second port for returning the medium and a flowpath therebetween, said pressure vessel defining an interior, said pressure vessel including a third port for the flow of the gas into or out of the interior;
    a plurality of modules within the interior, each said module being in fluid communication with the flowpath, each said module including:
    a hub, said hub having a plurality of heat exchanging fins extending outwardly from a central portion, said hub including a first passage in fluid communication with the first port and a second passage in fluid communication with the second port; and
    a gas absorbing solid substance formed into a shape that substantially surrounds said fins.

9. The apparatus of claim 8 wherein the substance absorbs the gas when said module is cooled and the substance desorbs the gas when said module is heated.

10. The apparatus of claim 8 wherein the substance and the absorbed gas are a metal hydride.

11. The apparatus of claim 8 wherein the shape substantially conforms to said fins.

12. The apparatus of claim 8 wherein each said module further comprises a containment vessel surrounding the substance for minimizing the movement of the substance within the pressure vessel.

13. An apparatus for exchanging heat with a coolant, comprising:
- a heat exchanging body including an outermost wall, at least one hub having an outer surface and an inner surface, and a plurality of fins extending from the hub to the outermost wall, the outer surface of said hub and said plurality of fins being arranged in a pattern capable of being extruded, the inner surface of said hub being tapered at an angle;
- a sleeve having an outer surface and an inner surface, the outer surface being tapered with about the same angle as the angle of said hub; and
- a generally cylindrical tube received within the inner surface of said sleeve, said tube providing a flow path for the coolant.

14. The apparatus of claim 13 wherein said body is a first body and which further comprises:
- a second heat exchanging body including an outermost wall, at least one hub having an outer surface and an inner surface, and a plurality of fins extending from the hub to the outermost wall, the outer surface of said hub and said plurality of fins being arranged in a pattern capable of being extruded, the inner surface of said hub being tapered at an angle; and
- wherein said sleeve has two ends and the outer surface is tapered in two directions, the outer surface being a maximum at a location intermediate of the two ends, the outer surface tapering from the intermediate location in directions toward each end.

15. The apparatus of claim 13 wherein said body is a first body and which further comprises:
- a second heat exchanging body including an outermost wall, at least one hub having an outer surface and an inner surface, and a plurality of fins extending from the hub to the outermost wall, the outer surface of said hub and said plurality of fins being arranged in a pattern capable of being extruded, the inner surface of said hub being tapered at an angle; and
- a compressibly deformable plate;
- wherein said first body and said second body are arranged in series on said sleeve, and said plate is located between said first body and said second body.

16. The apparatus of claim 15 wherein said plate is elastically compressed between said first body and said second body.

17. The apparatus of claim 15 wherein said plate is an assembly of first and second rings in sliding engagement, and further comprising at least one spring biasing said first ring apart from said second ring.

18. The apparatus of claim 13 which further comprises a compressibly deformable plate coupled to said sleeve at one end of said sleeve and between the one end and a face of said heat exchanging body.

19. The apparatus of claim 18 wherein the one end of said sleeve includes a ridge and the coupling of said sleeve to said plate is by abutment of said plate against the ridge.

20. The apparatus of claim 13 wherein said heat exchanging body has a length, and the length of said sleeve is about the same as the length of said body.

21. The apparatus of claim 13 wherein the cross-sectional shape of the inner surface of said hub is complementary to the cross-sectional shape of the outer surface of said sleeve.

22. The apparatus of claim 21 wherein the inner surface of said hub is conical and the outer surface of said sleeve is conical.

23. The apparatus of claim 13 wherein said plurality of fins define a plurality of generally triangular pockets therebetween.

* * * * *